United States Patent
Mincher et al.

(10) Patent No.: US 11,512,617 B2
(45) Date of Patent: Nov. 29, 2022

(54) JET PUMP DIFFUSER FOR A SEPARATOR

(71) Applicants: Adrian Richard Mincher, South Cave (GB); Carl Joseph Shaw, Brighouse (GB)

(72) Inventors: Adrian Richard Mincher, South Cave (GB); Carl Joseph Shaw, Brighouse (GB)

(73) Assignee: Parker Hannifin Manufacturing (UK) Ltd., Hemel Hempstead (GB)

( * ) Notice: Subject to any disclaimer, the term of this patent is extended or adjusted under 35 U.S.C. 154(b) by 261 days.

(21) Appl. No.: 16/947,964

(22) Filed: Aug. 26, 2020

(65) Prior Publication Data

US 2020/0398287 A1 Dec. 24, 2020

Related U.S. Application Data

(63) Continuation of application No. PCT/EP2019/061289, filed on May 2, 2019.

(51) Int. Cl.
*F04F 5/14* (2006.01)
*F01M 13/00* (2006.01)
(Continued)

(52) U.S. Cl.
CPC ......... *F01M 13/0011* (2013.01); *B01D 45/08* (2013.01); *B01D 45/16* (2013.01);
(Continued)

(58) Field of Classification Search
CPC ........ F04F 5/00; F04F 5/14; F04F 5/16; F04F 5/44; F04F 5/20–26; F04F 5/10;
(Continued)

(56) References Cited

U.S. PATENT DOCUMENTS 1,175,462 A * 3/1916 LeBlanc ................... F04F 5/46
417/151
1,179,369 A * 4/1916 Buss ................. B01F 25/31242
261/76
(Continued)

FOREIGN PATENT DOCUMENTS

CN 101389833 A * 3/2009 ............. F01M 13/04
CN 205152164 U 4/2016
(Continued)

OTHER PUBLICATIONS

Communication pursuant to Article 94(3) EPC for European Application No. 19 722 085.8 dated Nov. 12, 2021.
(Continued)

*Primary Examiner* — Thomas Fink
(74) *Attorney, Agent, or Firm* — Christopher H. Hunter

(57) ABSTRACT

A diffuser for a jet pump of a separator comprises an inlet defining a first flow area; an outlet in fluid communication with the inlet through which fluid exits the diffuser, in which a flow path extends from the inlet to the outlet, and in which the outlet defines a second flow area greater than the first flow area so that a velocity of fluid flowing through the inlet is greater than a velocity of fluid flowing through the outlet; and a communication port extending through a wall of the diffuser with an inlet in communication with an interior of the diffuser and an outlet in communication with an exterior of the diffuser, in which the communication port inlet is between the diffuser inlet and the diffuser outlet, so that contaminants separated from the fluid stream are removed through the communication port.

36 Claims, 10 Drawing Sheets

(51) Int. Cl.
  *B01D 45/08* (2006.01)
  *B01D 45/16* (2006.01)
  *B04C 9/00* (2006.01)
  *F04F 5/10* (2006.01)
  *F01M 13/04* (2006.01)
  *F04F 5/20* (2006.01)
  *F04F 5/44* (2006.01)

(52) U.S. Cl.
  CPC ............... *B04C 9/00* (2013.01); *F04F 5/10* (2013.01); *B04C 2009/007* (2013.01); *B04C 2009/008* (2013.01); *F01M 13/04* (2013.01); *F01M 2013/0016* (2013.01); *F01M 2013/0433* (2013.01); *F04F 5/20* (2013.01); *F04F 5/44* (2013.01)

(58) Field of Classification Search
  CPC ...... F04F 5/18; F04F 5/24; F04F 5/40; F01M 2013/026–027; F01M 2013/0488; F01M 2013/045; F01M 13/04; F01M 13/021; F01M 11/08; F01M 11/38; F01M 9/08; Y10S 55/19
  USPC .................................... 123/572–573; 417/159
  See application file for complete search history.

(56) References Cited

U.S. PATENT DOCUMENTS

| | | | | |
|---|---|---|---|---|
| 3,031,977 | A * | 5/1962 | Elliott | F04F 5/463 96/216 |
| 3,200,764 | A * | 8/1965 | Saunders, Jr. | B01F 25/3122 417/185 |
| 4,141,701 | A * | 2/1979 | Ewan | B01D 47/10 261/78.2 |
| 4,285,770 | A * | 8/1981 | Chi | F04F 5/44 376/407 |
| 4,321,006 | A | 3/1982 | von Ohain | |
| 4,681,610 | A | 7/1987 | Warner | |
| 5,125,428 | A | 6/1992 | Rauter | |
| 6,290,139 | B1 | 9/2001 | Kolze | |
| 7,243,642 | B2 | 7/2007 | Nishikawa | |
| 7,849,841 | B2 | 12/2010 | Holzmann | |
| 8,171,898 | B2 * | 5/2012 | Nagenkogl | F02F 1/242 123/41.72 |
| 8,936,202 | B2 * | 1/2015 | Kremer | F24D 10/00 236/13 |
| 10,184,229 | B2 * | 1/2019 | Kremer | F24H 4/04 |
| 2002/0162518 | A1* | 11/2002 | Dumaz | F04F 5/461 122/404 |
| 2004/0144374 | A1* | 7/2004 | Knollmayr | F01M 13/04 123/572 |
| 2005/0211323 | A1 | 9/2005 | Dushek | |
| 2006/0086649 | A1 | 4/2006 | Wieczorek | |
| 2006/0112941 | A1 | 6/2006 | Hilpert | |
| 2009/0314230 | A1 | 12/2009 | Nagenkogl | |
| 2009/0321444 | A1 | 12/2009 | Rumpf | |
| 2012/0318215 | A1 | 12/2012 | Copley | |
| 2014/0033922 | A1 | 2/2014 | Peck | |
| 2014/0165977 | A1* | 6/2014 | Copley | B01D 45/16 123/573 |
| 2016/0032798 | A1 | 2/2016 | Herman | |
| 2016/0138442 | A1 | 5/2016 | An | |
| 2017/0145878 | A1 | 5/2017 | Solberg | |
| 2018/0029046 | A1 | 2/2018 | Ishida | |
| 2018/0058738 | A1* | 3/2018 | Yokoyama | F04F 5/461 |

FOREIGN PATENT DOCUMENTS

| | | | |
|---|---|---|---|
| CN | 107023530 A | 8/2017 | |
| DE | 10236783 B4 | 12/2008 | |
| DE | 102008022279 A1 | 11/2009 | |
| DE | 1020150208906 A1 | 11/2016 | |
| EP | 1614871 A2 | 7/2005 | |
| FR | 3074426 A1 * | 6/2019 | ............ B01D 45/04 |
| JP | S6155398 A | 3/1986 | |
| SU | 687268 A1 | 9/1979 | |
| WO | 2011095790 A1 | 8/2011 | |
| WO | 2014155054 A1 | 10/2014 | |

OTHER PUBLICATIONS

Search Report for GB1807223.1 dated Oct. 29, 2018.
International Search Report and Written Opinion for PCT/EP2019/061289 dated Aug. 5, 2019.
Search Report for GB1807224.9 dated Nov. 16, 2018.
International Search Report and Written Opinion for PCT/EP2019/061197 dated Aug. 5, 2019.
International Preliminary Report on Patentability for PCT/EP2019/061197 dated May 11, 2020.
International Preliminary Report on Patentability for PCT/EP2019/061289 dated May 7, 2020.

* cited by examiner

JET PUMP DIFFUSER FOR A SEPARATOR

FIELD OF INVENTION

The present invention relates to a diffuser for a jet pump of a separator for separating contaminants from a fluid stream which includes entrained contaminants. The present invention also relates to a jet pump comprising such a diffuser, and to a separator comprising such a jet pump. In particular, but not exclusively, the present invention relates to a jet pump of a separator for separating contaminants from a fluid stream which includes entrained contaminants, the diffuser comprising an inlet portion having an inlet which is adapted to receive a fluid stream including residual entrained contaminants, and an outlet portion in fluid communication with the inlet portion and having an outlet through which fluid exits the diffuser. Various other separators are also disclosed.

BACKGROUND

Blow-by gas within a reciprocating engine is generated as a by-product of the combustion process. During combustion, some of the mixture of combustion gases escapes past piston rings or other seals and enters the engine crankcase outside of the pistons. The term "blow-by" refers to the fact that the gas has blown past the piston seals. The flow level of blow-by gas is dependent upon several factors, for example the engine displacement, the effectiveness of the piston cylinder seals and the power output of the engine. Blow-by gas typically has the following components: oil (as both a liquid and an aerosol, with aerosol droplets in the range 0.1 µm to 10 µm), soot particles, nitrous oxides (NOx), hydrocarbons and other organic species, carbon monoxide, carbon dioxide, oxygen, water, and other gaseous air components.

If blow-by gas is retained within a crankcase with no outlet, the pressure within the crankcase rises until the pressure is relieved by leakage of crankcase oil elsewhere within the engine, for example at the crankcase seals, dipstick seals or turbocharger seals. Such a leak may result in damage to the engine.

In order to prevent such damage, and excessive loss of oil, it is known to provide an outlet valve that allows the blow-by gas to be vented to the atmosphere. However, with increasing environmental awareness generally, and within the motor industry in particular, it is becoming unacceptable to allow blow-by gas to be vented to atmosphere due to the discharge of oil and other contaminants from within the crankcase. Furthermore, such venting increases the speed at which crankcase oil is consumed.

Consequently, it is known to filter the blow-by gas. The filtered blow-by gas may then either be vented to the atmosphere as before (in an open loop system), or it may be returned to an air inlet of the engine (in a closed loop system). The blow-by gas may pass through a filtering medium or another known form of gas contaminant separator. The conventional arrangement of an engine blow-by gas/oil separator returning cleaned gas to an engine air intake is commonly referred to as a Closed Crankcase Ventilation (CCV) system.

The filtering of engine blow-by gas using impaction separators which remove contaminants (particularly oil aerosols) from the gas is well known. Typically, separators are fitted downstream of the gases being vented from the engine crankcase, with oil that is separated from the blow-by gasses returned to the engine sump via a drain hose.

As mentioned above, it is necessary to avoid unacceptably high engine crankcase pressures, in order to avoid oil leakage. To this end, the separator must be arranged so that a flow pressure differential across the separator is below an allowable limit set by the engine manufacturer. Typically, an upper limit of between around 5 mbar and 50 mbar is set. The blow-by gas which has been 'cleaned' by the separator is returned to the air intake of the engine. In this way, it is ensured that minimal oil aerosols are vented to atmosphere. In some countries, this is a specific requirement of relevant emissions legislation. For closed crankcase ventilation systems, the separation performance of the separator, and the prevention of oil mist contaminating the turbo compressor wheel, are fundamental, measured technical requirements.

The maximum gravimetric efficiency of a separator having a pressure differential within the range defined by either open or CCV systems have been measured and are known in the industry. Generally, 70%-80% of oil aerosols can be removed by mass. Utilising state of the art equipment, the fractional efficiency (i.e. the separation performance at any given particle size) can be measured to particle sizes as small as 0.03 µm. The particle challenge characteristics of the engine can similarly be measured. With engine distribution data and high-resolution fractional efficiency data, the gravimetric efficiency of a separator can now be accurately predicted. In the course of several years of research the previously accepted performance limits of impaction separators for blow-by emissions control have been exceeded. Efficiency levels of 98% and higher have been achieved.

International Patent Publication No. WO-2014/155054 discloses a prior separator in which contaminated engine crankcase blow-by gases entering a first chamber are separated from a second chamber by a rolling diaphragm forming a radial seal at the interface between the chambers. The first chamber has approximately the same pressure as the engine crankcase, while the second chamber references atmosphere. Blow-by gas enters a third chamber by passing through an acceleration aperture. Impaction and separation of oil particles due to radial acceleration occurs both on the diaphragm face, and on the surface of an annular coalescer material inserted opposite the outlet of the acceleration aperture. Use of a pre-cyclone, and the separator described, provides a high efficiency of oil removal, meeting the required gravimetric performance.

A jet pump is connected downstream of the third chamber, to create pressure lift. The jet pump is powered via air bleed from a turbocharger of the engine, and thus synergy is used to create pressure lift. The developed pressure lift is used to enhance the performance of the inertial separator, subjecting the third chamber to a vacuum. Separated oil is agglomerated into liquid droplets which drain into a sump. This oil will drain into the first chamber when the engine is keyed off, or at some idle conditions when the differential over the valve is less than 1 mbar. When the oil reaches the first chamber, it can drain through a lower spigot back to the engine crankcase.

The jet pump operates by taking a small amount of boosted air from a pre or post turbocharger intercooler manifold and directing it through a jet nozzle. The air expands and passes through a diffuser of progressively increasing flow area, entering an inlet of the diffuser at a velocity of up to around 450 m/s. This creates a static negative pressure in the third chamber, thus effectively subjecting the third chamber to a vacuum. The high velocity of the air passing through the jet pump diffuser can cause a proportion of any residual oil to separate/condense into liquid droplets at a boundary layer adjacent a wall of the diffuser. It is possible that this oil could migrate to the outlet, and eventually exit to the turbocharger or atmosphere. It is therefore desirable to improve separator efficiency.

SUMMARY

According to a first aspect of the present invention, there is provided a diffuser for a jet pump of a separator for separating contaminants from a fluid stream which includes entrained contaminants, the diffuser comprising:

a. an inlet portion having an inlet which is adapted to receive a fluid stream including residual entrained contaminants, the inlet defining a first flow area;

b. an outlet portion in fluid communication with the inlet portion and having an outlet through which fluid exits the diffuser, in which a flow path for the fluid stream is defined which extends from the inlet to the outlet, and in which the outlet defines a second flow area which is greater than the first flow area so that a velocity of fluid flowing through the inlet is greater than a velocity of fluid flowing through the outlet; and c. a communication port extending through a wall of the diffuser and having an inlet which communicates with an interior of the diffuser and an outlet which communicates with an exterior of the diffuser, in which the inlet of the communication port is located at a position along the flow path which is between the inlet of the diffuser and the outlet of the diffuser, so that contaminants which have become separated from the fluid stream during flow along the flow path can be removed from the diffuser through the communication port.

The present invention provides the advantage that it enables contaminants which have become separated from the fluid stream during flow along the diffuser, and/or which have condensed on an inner wall of the diffuser, to be removed from the diffuser through the communication port. This reduces the risk of the contaminants passing to the outlet of the diffuser and so exiting to the atmosphere, or to other engine components such as a compressor of a turbocharger. Typically, residual contaminants separated and/or which have condensed from the fluid stream will reside on an inner wall of the diffuser, where they risk becoming re-entrained with fluid in the fluid stream.

Reference is made in this document to a "jet pump". The terms "eductor pump" and "venturi pump" may be used interchangeably with the term jet pump.

Reference is made to the removal of residual contaminants entrained in the fluid stream. It will be understood that these are contaminants which remain in the fluid stream following separation from the fluid stream upstream of the jet pump, for example by impacting on an impaction surface of the separator.

Reference is made to flow areas defined by the inlet and the outlet of the diffuser. It will be understood that these may be taken to be areas defined by openings of the diffuser which form the inlet and the outlet.

The diffuser may serve for reducing the velocity of the fluid in the flow path from a first velocity at the diffuser inlet to a second, lower velocity at the diffuser outlet. The diffuser may also serve for increasing the pressure of the fluid in the flow path from a first pressure at the diffuser inlet to a second, higher pressure at the diffuser outlet. A lower velocity/higher pressure flow may be more suitable for discharge to the atmosphere and/or supply to an engine component such as a compressor of a turbocharger. The diffuser may act as, or make generally take the form of, a venturi tube. As will be understood by persons skilled in the art that such flow velocity decrease and pressure increase may cause contaminants to separate from the fluid in the fluid stream and/or condensation of contaminants on the inner wall of the diffuser.

The outlet of the communication port may be adapted to be exposed to fluid at a pressure which is lower than a pressure of the fluid contained within the diffuser, so that contaminants are drawn through the communication port. The contaminants may be entrained within a bleed stream separated from the fluid stream flowing along the flow path through the diffuser. The outlet may be adapted to be coupled to a source of a vacuum. The inlet of the communication port may be adapted to be exposed to fluid contained within the diffuser. The outlet may be adapted to communicate with a fluid which is at a pressure that is less than the pressure of the fluid contained within the diffuser, which fluid may be contained within a part of the diffuser that the inlet of the communication port opens on to. This may create a pressure differential across the communication port from its inlet to its outlet, which may serve to draw contaminants through the communication port (which may be entrained within the bleed stream). The outlet may be adapted to communicate with a chamber containing a fluid which is at a pressure which is less than the pressure of the fluid contained within the diffuser.

The diffuser may be tubular and may have a generally circular shape in cross-section. The diffuser may define a bore extending from the inlet to the outlet. The bore may be generally circular in shape. Other arcuate shapes for the diffuser/bore may be suitable, including elliptical and oval. The diffuser may have a substantially constant internal profile (for example circular) extending from the inlet to the outlet.

The communication port, or at least its inlet, may be disposed in a location which promotes the flow of contaminants from the diffuser under the action of gravity. The communication port may extend through a part of the wall of the diffuser which is disposed lowermost, and which may be disposed lowermost during use of the diffuser. This may facilitate flow of contaminants from the diffuser into the communication port. The communication port may be disposed at a location on a perimeter of the diffuser which is disposed lowermost. The communication port may be disposed at or near a position that is approximately 180° around a circumference of the diffuser from an upper region of the diffuser, when looking along its length (i.e. a six o'clock position).

The communication port may be defined by a bore extending through the wall of the diffuser. The bore may have a longitudinal axis extending between the inlet and the outlet of the port. The axis may be substantially parallel to a longitudinal axis of the diffuser, the diffuser axis extending between its inlet and its outlet.

Whilst the withdrawal of contaminants from the diffuser can be affected via a single communication port, it will be understood that the diffuser may comprise a plurality of communication ports. The communication ports may be spaced apart around a perimeter of the diffuser, and/or along a length of the diffuser.

The diffuser may comprise a contaminant outlet tube in fluid communication with the outlet of the communication port. The outlet tube may define a passage for the flow of contaminants (and fluid in which the contaminants may be entrained) from the diffuser to a remote location. The outlet tube may advantageously provide the ability to discharge contaminants to a calm zone, which may be an area of the separator which experiences reduced fluid disturbance in comparison to other areas of the separator. This may help to avoid re-entrainment of the contaminants in the fluid flowing through the separator and into the diffuser. The outlet tube may comprise an inlet which communicates with the outlet of the communication port. The outlet tube may be provided integrally with the diffuser.

The diffuser may comprise a transition portion disposed between the inlet portion and the outlet portion. The transition portion may define a third flow area which is greater than the first flow area but less than the second flow area. This may promote the formation of an eddy within the outlet portion. The eddy may be disposed downstream of the transition portion and may be disposed towards or within a boundary layer of the fluid contained within the diffuser. As will be understood by persons skilled in the art, the boundary layer forms adjacent a boundary of the diffuser, in this case an inner wall of the diffuser. A portion of the fluid flowing along the flow path from the inlet towards the outlet may enter the eddy. Fluid in the eddy may flow in a reverse direction from the outlet back towards the inlet, which may re-entrain contaminants (that may reside on an inner wall of the outlet portion) which have separated or condensed from the fluid stream during flow along the flow path. The portion of the fluid may flow along an eddy flow path, which may extend generally in a loop so that the fluid in the eddy flow path flows along the diffuser generally towards the outlet before reversing direction to flow generally towards the inlet. The portion of the fluid may flow around the eddy flow path multiple times. The portion of the fluid may leave the eddy flow path and exit the diffuser through the communication port.

The inlet of the diffuser may describe a maximum internal dimension, which may be a width (and which may be a diameter when the diffuser bore is circular). The outlet may describe a maximum internal dimension, which may correspond to that of the inlet, and which may be a width (optionally a diameter). The maximum internal dimension described by the outlet may be greater than the corresponding maximum internal dimension defined by the inlet.

The transition portion may define an opening describing a maximum internal dimension, which may correspond to that of the inlet, and which may be a width (optionally a diameter). The maximum internal dimension described by the opening of the transition portion may be greater than the corresponding maximum internal dimension defined by the inlet, and less than the corresponding maximum internal dimension defined by the outlet. This may assist in formation of the eddy, which may be formed at or near to an intersection between the transition portion and the outlet portion.

The transition portion may comprise a lip, or a ridge, rim, ledge, step or shoulder, which may describe the maximum internal dimension of the opening. The lip may be defined between the inlet portion and the outlet portion. The lip may be disposed in the flow path. An internal bore of the diffuser may step up from the maximum internal dimension described by the lip, to the maximum internal dimension defined by the outlet. The step change in the dimension may promote formation of the eddy, which may form at a location downstream of the lip.

The lip may define a surface which faces generally towards the outlet of the diffuser. The diffuser may define a longitudinal axis extending from the inlet to the outlet. The lip surface may be disposed transverse to the longitudinal axis. This may promote the flow of contaminants, particularly liquid contaminants such as oil, (which have separated/condensed from the fluid stream e.g. on to the internal surface of the diffuser) towards a lower region of the diffuser, under the action of gravity.

The lip surface may be disposed at a non-perpendicular angle relative to the longitudinal axis. The lip surface may be disposed at an angle of up to around 89° relative to the longitudinal axis, optionally in the range of about 80° to about 89°, for example about 80° to about 85°. The lip surface may therefore be disposed at an angle of at least 1° relative to a line which is perpendicular to the longitudinal axis. The lip surface may be declined in a direction from an upper region of the diffuser towards a lower region of the diffuser. A portion of the lip surface which is disposed towards the lower region of the diffuser may therefore be closer to the outlet than a portion of the lip surface which is disposed towards the upper region of the diffuser.

The lip surface may be substantially planar so that all of the lip surface is in the same plane and at the same angle. The lip surface may alternatively be curved.

The communication port may be located generally in the region of an intersection between the transition portion and the outlet portion. This may promote the flow of fluid with entrained contaminants through the communication port, and in particular the drawing of fluid flowing in the eddy through the port. The lip surface may be arranged relative to the inlet of the communication port so as to promote the flow of contaminants from the lip surface towards the inlet. The lip surface may comprise a lower region which is arranged to discharge fluid running along the lip surface from the surface and into the inlet of the communication port. This may be achieved by positioning the lip surface so that an edge of the lip surface is adjacent to the inlet, suitably above the inlet, and proximate to the inlet in a direction along the length of the diffuser. The inlet of the communication port may communicate with the outlet portion of the diffuser. The inlet may open on to the outlet portion. However, at least part of the inlet may open on to the transition portion, for example the lip surface. The inlet may straddle the transition portion (for example the lip surface) and the outlet portion.

The diffuser may comprise a channel extending at least part way around an internal surface of the diffuser. The channel may communicate with the communication port of the diffuser. The channel may serve for directing contaminants to the inlet of the communication port. The channel may extend around an internal perimeter of the diffuser, which may be an internal circumference where the diffuser has a circular bore. The channel may extend around the entire internal surface of the diffuser.

The provision of such a channel may provide the advantage that it helps to prevent re-entrainment of contaminants which have separated from the fluid flowing through the diffuser back into the body of fluid flowing along the diffuser towards the outlet. The channel may also assist in directing contaminants to the communication port for evacuation.

The channel may be disposed at a non-perpendicular angle relative to a longitudinal axis of the diffuser. The channel may be disposed at an angle of up to around 89° relative to the longitudinal axis, optionally in the range of about 80° to about 89°, for example about 80° to about 85°. The channel may therefore be disposed at an angle of at least 1° relative to a line which is perpendicular to the longitudinal axis. The channel may be declined in a direction from an upper region of the diffuser towards a lower region of the diffuser. A portion of the channel which is disposed towards the lower region of the diffuser may therefore be closer to the outlet than a portion of the lip surface which is disposed towards the upper region of the diffuser.

The channel may be defined by a channel element, which may be located within the diffuser at a position along the flow path which is disposed between the inlet of the diffuser and the outlet of the diffuser. The channel element may be an insert which is adapted to be located within the diffuser, suitably within the bore of the diffuser. The channel element may be annular or generally ring-shaped.

The channel may be defined between an external surface of the channel element and the internal surface of the diffuser. The channel element may comprise an inner surface defining a tubular bore forming part of the flow path, and an outer surface which defines the channel. The channel element may comprise a recess or step in the outer surface, which may extend at least part way around the outer surface, and which at least partly defines the channel. The channel may be defined between the recess and the internal surface of the diffuser.

The channel element may comprise at least one flow passage which communicates with the channel. Contaminants may be drawn through said flow passage into the channel, and then out of the diffuser through the communication port.

At least one downstream flow passage may be provided, having a first end which opens on to the channel, and a second end which opens on to the interior of the diffuser at a location which is downstream of the communication port. Said flow passage may serve for drawing contaminants in or near an eddy defined downstream of the channel element into the channel and so to the communication port.

At least one upstream flow passage may be provided, having a first end which opens on to the channel, and a second end which opens on to the interior of the diffuser at a location which is upstream of the communication port. Said flow passage may serve for drawing contaminants at or near an internal surface of the diffuser (e.g. in a boundary layer) upstream of the channel element into the channel and so to the communication port.

The at least one flow passage may extend through the channel element, and may extend through a body of the channel element. This may apply particularly to a downstream flow passage. Said flow passage may be: a closed passage such as a bore; or a recess formed in an outer surface of the channel element, the flow passage being defined by the recess and an internal surface of the diffuser.

The channel element may comprise a plurality of flow passages, which may be spaced apart around a perimeter of the channel element. Where the channel element is annular/ring-shaped, the flow passages may be spaced apart around a circumference of the element. The flow passages may be equally spaced. Whilst any suitable number of passages may be provided, possible arrangements include flow passage spacings of: 120°; 90°; 60°; 45° and 30°. A particularly suitable spacing may be 90°. It will be understood that the spacings may be measured from centre to centre of the flow passages, considered in a direction around the perimeter of the channel element.

The at least one flow passage may be defined between an external surface of a part of the channel element and an internal surface of the diffuser. This may apply particularly to an upstream flow passage. Said flow passage may be a space or void extending at least part way around the external surface of said part of the channel element, which may be an annular passage. Said flow passage may extend around an entire perimeter of the channel element.

The channel element may comprise a shoulder part adapted to abut an internal surface of the diffuser (which may serve for mounting the channel element in the diffuser), and a channel part which extends from the shoulder part and which defines at least part of the channel. The shoulder part and the channel part may be provided integrally or as separate parts which are coupled together. Where the channel element comprises at least one upstream flow passage, the channel part may define said flow passage. The channel part may be mountable within the diffuser bore so that it is free floating/cantilevered within the bore, spaced from the internal surface of the diffuser. This may be achieved via the shoulder part, which mounts the channel element in the diffuser.

The channel element may comprise a central opening forming part of, and/or which is on or in, the flow path. The central opening may define a further flow area which is less than the second flow area. The central opening may define a further flow area which is greater than the first flow area.

The channel element may define at least part of the transition portion. The channel element may be provided at a location which is downstream of the transition portion, along the flow path.

According to a second aspect of the present invention, there is provided a jet pump comprising a diffuser according to the first aspect of the invention.

According to a third aspect of the present invention, there is provided a separator comprising a jet pump having a diffuser according to the first aspect of the invention.

Further features of the diffuser forming part of the jet pump of the second and third aspects of the invention may be derived from the text set out elsewhere in this document, in particular from the text defining optional further features of the diffuser of the first aspect of the invention.

The separator may comprise a housing defining an inlet. The separator may comprise a first chamber, which may be defined within the housing, the first chamber arranged to receive a first fluid stream from the inlet for flow along the chamber, optionally for axial flow along the chamber. The separator may comprise an impaction surface provided within the housing and located downstream of the first chamber. The impaction surface may be arranged to deflect the first fluid stream after it leaves the first chamber such that contaminants are separated from the first fluid stream. The separator may comprise a further chamber defined by the housing and arranged to receive the first fluid stream following impaction on the impaction surface. The separator may comprise a dividing wall which separates the further chamber from the impaction surface, the dividing wall having at least one aperture formed in it through which the first fluid stream can pass out of the chamber towards the impaction surface. The separator may comprise an actuator which is arranged to move along an actuator axis to adjust the open cross-sectional area of the at least one aperture in the dividing wall according to a pressure differential between fluid pressure in the first chamber and a pressure reference (which may be atmospheric pressure) by moving along the dividing wall so as progressively to occlude the apertures.

The fluid stream flowing along the diffuser may contain residual contaminants which remain entrained with the fluid following impaction on the impaction surface. The fluid stream including residual entrained contaminants may be a second fluid stream and may comprise the first fluid stream exiting the chamber following impaction on the impaction surface, and a further fluid injected into the separator through an injection assembly of the jet pump. The first fluid stream may therefore be entrained with the fluid injected through the injection assembly and directed into the diffuser. The jet pump may serve for accelerating the velocity of the fluid that has exited the chamber following impaction on the impaction surface. This may generate a region of reduced pressure which serves to draw the first fluid stream through the separator, in particular through the at least one aperture in the dividing wall.

The actuator may comprise a flexible seal for occluding the at least one aperture, which may be a flexible diaphragm. The chamber having an inlet through which a fluid stream enters the separator may be a first chamber. The separator may comprise a second chamber which references atmospheric pressure, and which may provide the pressure reference. The seal may isolate the first chamber from the second chamber. The separator may comprise a third chamber. The impaction surface may be disposed in the third chamber. The outlet of the diffuser communication port may communicate with the third chamber. The third chamber may contain fluid at a pressure which is less than the pressure of the fluid contained within the diffuser (at least in the region of the communication port). The inlet of the diffuser may communicate with the third chamber so that, during operation of the jet pump, the flow of fluid along the flow path through the diffuser acts to reduce the pressure of fluid in the third chamber relative to the pressure of fluid in the first chamber, to draw fluid through the separator (in particular the at least one aperture in the dividing wall) and into the third chamber.

The actuator may be movable between a fully open position (which may be an upper position) in which the seal provides a minimum occlusion of the at least one aperture and a fully closed position (which may be a lower position) in which the seal provides a maximum occlusion of the at least one aperture. The seal may be configured so that the at least one aperture is not occluded when it is in its fully open position. The seal may be configured to completely occlude the at least one aperture in its fully closed position. Occlusion of the at least one aperture may involve restricting an effective flow area of the aperture.

The dividing wall may comprise a plurality of apertures. Each aperture may be at least one of circumferentially spaced around and axially spaced along the dividing wall from at least one other aperture.

The dividing wall may have a cylindrical tubular shape. The chamber may be defined by the dividing wall. The cylindrical tubular shape of the dividing wall may have a circular cross-section.

The jet pump may be located downstream of the impaction surface, and arranged to generate a pressure differential which draws the first fluid stream through the separator. The jet pump may be coupled to the housing, and may comprise a fluid injection assembly and the diffuser. The diffuser may be arranged in fluid communication with the further chamber so that the first fluid stream exits the further chamber and flows into the diffuser. The fluid injection assembly may be arranged to inject a further fluid into the diffuser to form a second fluid stream comprising the injected fluid and the first fluid stream. The further fluid may be air derived, for example, from a turbocharger of an engine. The fluid injection assembly may comprise an injector arranged to inject the further fluid into the diffuser, and a flange for securing the injection assembly to the housing. The flange may be sealingly coupled to the housing via a friction weld. Use of a friction weld may both securely couple the flange (and so the injection assembly) to the housing and seal the flange (and so the injection assembly) relative to the housing. This may be achieved in a single procedure/step and may avoid a requirement to provide other couplings such as a threaded coupling, nut and bolt assemblies or the like between the flange and the housing. The housing and the flange may be of a plastics material, which may be a polymeric material, and which may be a thermoplastics material. This may promote fusion welding, such as a spin welding technique, an ultrasonic welding technique, or an electromagnetic welding technique. Other parts of the separator, including of the injection assembly, may be formed of such materials.

The separator housing may define a drain.

The jet pump may be a primary jet pump located downstream of the impaction surface, the primary jet pump arranged to generate a pressure differential which draws the first fluid stream through the separator. The primary jet pump may comprise a fluid injection assembly and a diffuser, the diffuser arranged in fluid communication with the further chamber so that the first fluid stream exits the further chamber and flows into the diffuser. The fluid injection assembly may be arranged to inject a further fluid into the diffuser to form a second fluid stream comprising the injected fluid and the first fluid stream.

The separator may comprise a secondary jet pump for evacuating contaminants from the further chamber, which contaminants have been separated from the first fluid stream and collected in the further chamber. The secondary jet pump may communicate with the drain so that the contaminants can exit the separator through the drain. The secondary jet pump may be disposed entirely within the separator housing.

The provision of a secondary jet pump provides the advantage that contaminants can be continuously drained from the further chamber during operation of the separator. Accordingly, drainage of contaminants does not require a vehicle engine to be keyed off, and so deactivation of the separator.

Positioning the secondary jet pump entirely within the housing enables fluid flow to and through the secondary jet pump to be routed internally of the separator, which may provide advantages including ease of manufacture and/or assembly, improved safety (less likelihood of damage to externally routed piping), and improved aesthetic qualities.

The secondary jet pump may be arranged to generate a pressure differential which draws the contaminants from the further chamber. The secondary jet pump may receive a supply of further fluid from the injector assembly of the primary jet pump, to generate the pressure differential. The secondary jet pump may comprise a fluid injection assembly and a diffuser. The injection assembly of the secondary jet pump may receive the supply of further fluid from the primary jet pump. The injection assembly of the secondary jet pump may direct the supply of further fluid into an inlet of its diffuser. The injection assembly of the secondary jet pump may communicate with the injection assembly of the primary jet pump for the supply of further fluid to the secondary jet pump. A communication channel may be provided between the injection assembly of the primary jet pump and the secondary jet pump, which communication channel may be routed internally of the housing. The diffuser of the secondary jet pump may have an outlet which communicates with a lower chamber of the separator, which may define the drain. The secondary jet pump may communicate with the further chamber so that contaminants are drawn from the further chamber and directed into its diffuser for discharge into the lower chamber. The contaminants may be drawn into the diffuser by the pressure differential which is created by operation of the secondary jet pump. The secondary jet pump may open on to the further chamber at a location which is between the injection assembly and the diffuser.

The fluid injection assembly of the primary jet pump may comprise an injector arranged to inject the further fluid into the diffuser, and a flange coupled to the injector for securing the injector to the housing. The flange may be sealingly coupled to the housing via a friction weld. The fluid injection assembly may comprise an inlet tube, and a flange coupled to the inlet tube for securing the inlet tube to the housing. The flange may be sealingly coupled to the housing via a friction weld. The injector flange and the inlet tube flange may be friction welded to the housing in a single step or procedure. The injector flange may be an inner flange, and the inlet flange may be an outer flange. A chamber may be defined between the inlet tube and the injector, which may communicate with the secondary jet pump, in particular with the communication channel.

According to a fourth aspect of the present invention, there is provided a separator for separating contaminants from a fluid stream which includes entrained contaminants, comprising:

a. a housing defining an inlet;
b. a first chamber provided within the housing and arranged to receive a first fluid stream from the inlet for flow along the chamber;
c. an impaction surface provided within the housing and located downstream of the first chamber, the impaction surface being arranged to deflect the first fluid stream after it leaves the first chamber such that contaminants are separated from the first fluid stream;
d. a further chamber provided within the housing and arranged to receive the first fluid stream following impaction on the impaction surface; and
e. a jet pump located downstream of the impaction surface, the jet pump arranged to generate a pressure differential which draws the first fluid stream through the separator;
f. in which the jet pump is coupled to the housing and comprises a fluid injection assembly and a diffuser, the diffuser arranged in fluid communication with the further chamber so that the first fluid stream exits the further chamber and flows into the diffuser, and the fluid injection assembly arranged to inject a further fluid into the diffuser to form a second fluid stream comprising the injected fluid and the first fluid stream;
g. and in which the fluid injection assembly comprises an injector arranged to inject the further fluid into the diffuser, and a flange for securing the injection assembly to the housing, the flange being sealingly coupled to the housing via a friction weld.

The separator may comprise a dividing wall provided within the housing and which separates the first chamber from the impaction surface. The dividing wall may have at least one aperture formed in it through which the first fluid stream can pass out of the first chamber towards the impaction surface. The pressure differential generated by the jet pump may draw the first fluid stream through the at least one aperture. The separator may comprise an actuator which is arranged to move along an actuator axis to adjust an open cross-sectional area of the at least one aperture in the dividing wall according to a pressure differential between fluid pressure in the first chamber and a pressure reference by moving along the dividing wall so as progressively to occlude the at least one aperture.

According to a fifth aspect of the present invention, there is provided a method of assembling a separator for separating contaminants from a fluid stream which includes entrained contaminants, in which the method comprises:

a. providing a housing defining an inlet;
b. providing a first chamber within the housing which can receive a first fluid stream from the inlet for flow along the chamber;
c. providing an impaction surface within the housing and arranging the impaction surface so that it is located downstream of the first chamber so that it can deflect the first fluid stream after it leaves the first chamber to separate contaminants from the first fluid stream;
d. providing a further chamber within the housing which can receive the first fluid stream following impaction on the impaction surface;
e. coupling a jet pump comprising a fluid injection assembly and a diffuser to the housing downstream of the impaction surface, the jet pump being arranged to generate a pressure differential which draws the first fluid stream through the separator;
f. arranging the diffuser in fluid communication with the further chamber so that the first fluid stream can exit the further chamber and flow into the diffuser;
g. arranging an injector of the fluid injection assembly so that it can inject a further fluid into the diffuser to form a second fluid stream comprising the injected fluid and the first fluid stream; and
h. securing the fluid injection assembly to the housing by sealingly coupling a flange of the injection assembly to the housing using a friction welding procedure.

Further features of the separator of the fourth aspect of the invention (for example of the jet pump and particularly the injection assembly and the diffuser), and the method of the fifth aspect of the invention, may be derived from the text set out elsewhere in this document, in particular from the text relating to any one of the first to third aspects of the invention.

According to a sixth aspect of the present invention, there is provided a separator for separating contaminants from a fluid stream which includes entrained contaminants, comprising:

a. a housing defining an inlet and a drain;
b. a first chamber provided within the housing and arranged to receive a first fluid stream from the inlet for flow along the chamber;
c. an impaction surface provided within the housing and located downstream of the first chamber, the impaction surface being arranged to deflect the first fluid stream after it leaves the first chamber such that contaminants are separated from the first fluid stream;
d. a further chamber provided within the housing and arranged to receive the first fluid stream following impaction on the impaction surface;
e. a primary jet pump located downstream of the impaction surface, the primary jet pump arranged to generate a pressure differential which draws the first fluid stream through the separator, in which the primary jet pump comprises a fluid injection assembly and a diffuser, the diffuser arranged in fluid communication with the further chamber so that the first fluid stream exits the further chamber and flows into the diffuser, and the fluid injection assembly arranged to inject a further fluid into the diffuser to form a second fluid stream comprising the injected fluid and the first fluid stream; and
f. a secondary jet pump for evacuating contaminants from the further chamber, which contaminants have been separated from the first fluid stream and collected in the further chamber, in which the secondary jet pump communicates with the drain so that the contaminants can exit the separator;

g. in which the secondary jet pump is disposed entirely within the separator housing.

Further features of the separator of the sixth aspect of the invention (for example of the primary and secondary jet pumps) may be derived from the text set out elsewhere in this document, in particular from the text relating to any one of the first to fifth aspects of the invention.

In another aspect of the present invention, there is provided a crankcase ventilation system comprising the separator of any one of the third, fourth or sixth aspects of the invention.

Further aspects of the invention may comprise one or more feature derived from one or more of the aspects of the invention set out above.

DRAWINGS

Embodiments of the present invention will now be described, by way of example only, with reference to the accompanying drawings, in which.

Figure 9:
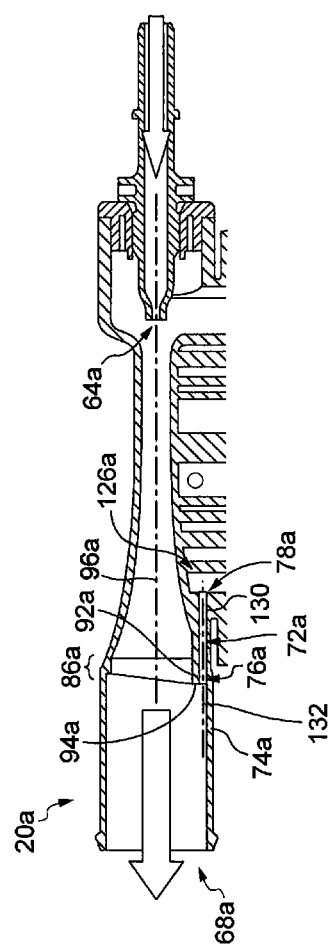
Figure 10:
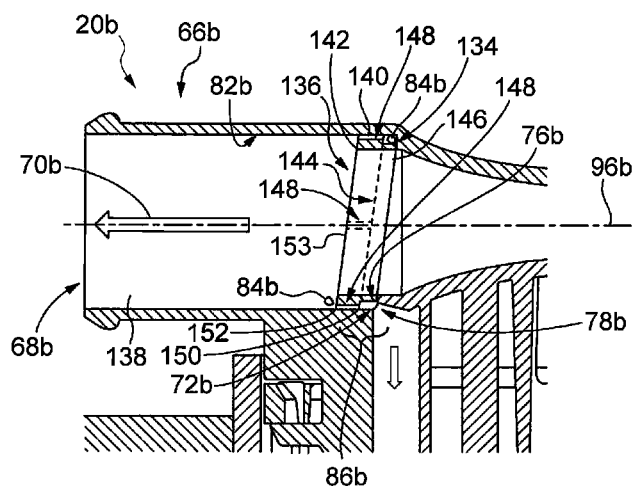
Figure 11:
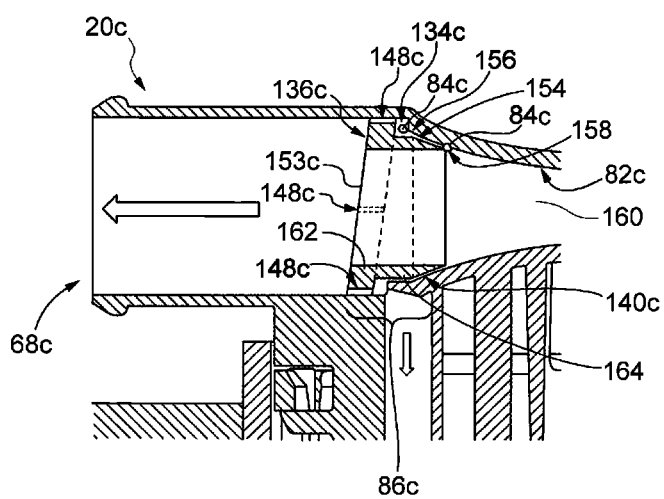

FIG. 9 is a cross-sectional side view of a diffuser for a jet pump in accordance with another embodiment of the present invention; and FIG. 10 is a cross-sectional side view of part of a diffuser for a jet pump in accordance with a further embodiment of the present invention; and FIG. 11 is a cross-sectional side view of part of a diffuser for a jet pump in accordance with a further embodiment of the present invention.

DETAILED DESCRIPTION

Figure 1:
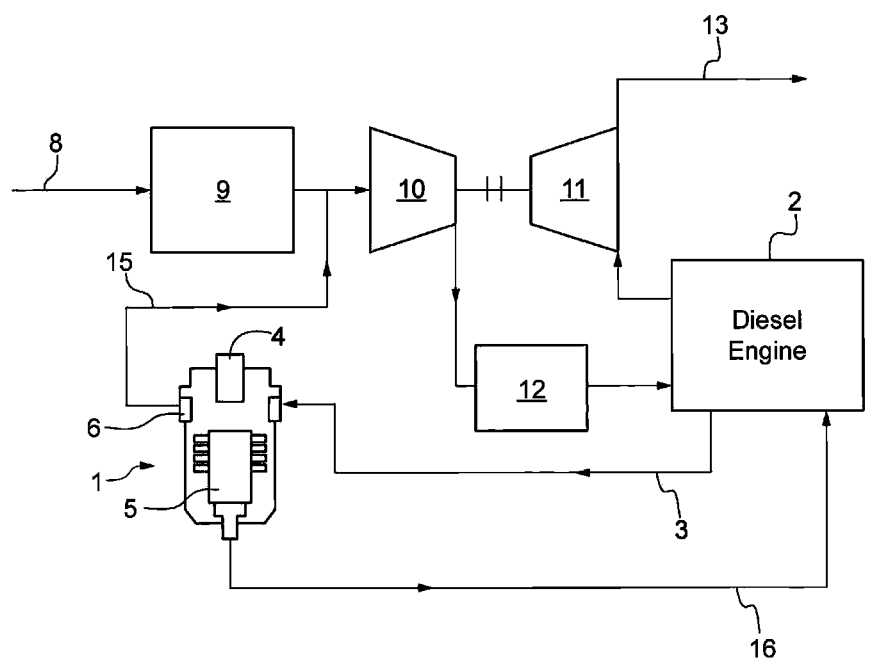
FIG. 1 is a schematic illustration of an engine system including a closed crankcase ventilation (CCV) system.

FIG. 1 illustrates schematically the arrangement of a CCV system 1 coupled to a diesel engine 2. Blow-by gas from the engine crankcase passes to the CCV system 1 along inlet duct 3. The CCV system 1 comprises a regulator 4 coupled to the inlet duct 3 and a contaminant separator 5 in series. The regulator 4 and separator 5 are shown combined in FIG. 1.

A pump 6 (which takes the form of a jet pump) is provided within the CCV system 1 to increase the pressure drop across the separator 5, thereby increasing the filtering efficiency. Cleaned blow-by gas exits the CCV system 1 through gas outlet 15 and is returned to the engine air intake system. Specifically, the engine air intake system draws in air from outside of the vehicle through an inlet 8, the air then passing through an inlet air filter and silencer 9, a compressor 10 driven by a turbocharger 11 (in turn driven by the engine exhaust 13) and an after cooler 12 to cool the compressed air before it is supplied to the engine 2. The cleaned blow-by gas passes from the gas outlet 15 to the compressor 10. Oil and other contaminants separated from the blow-by gas are returned to the engine crankcase through an oil drain 16.

The present invention provides a diffuser for a jet pump of a separator for separating contaminants from a fluid stream which includes entrained contaminants. The present invention also provides a jet pump comprising such a diffuser, and an actuator comprising a jet pump having such a diffuser. Other aspects of the invention relate to separators having different features, and to a method of assembling a separator. The separators of the present invention may provide the separator 5 in the CCV system 1 shown in FIG. 1 and described above.

Figure 2:
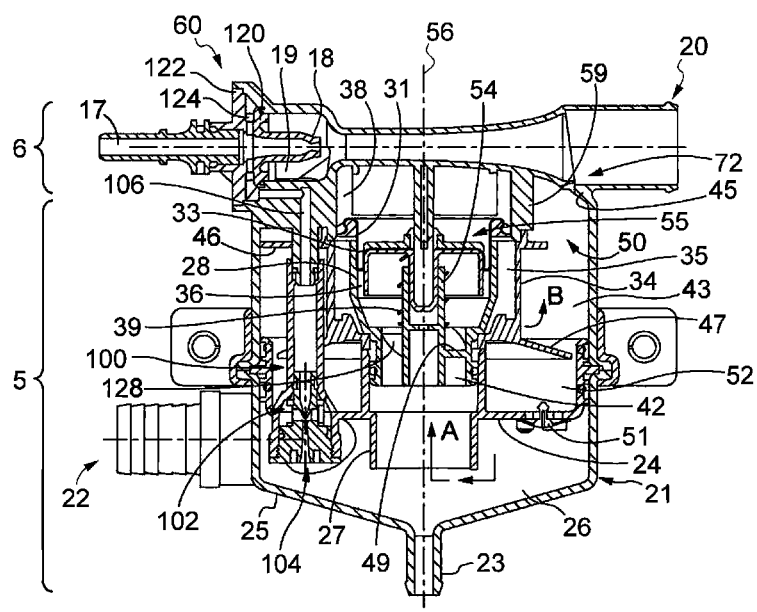
FIG. 2 is a cross-sectional side view of the CCV system shown in FIG. 1, comprising a separator including a jet pump having a diffuser, according to an embodiment of the present invention, an actuator of the separator shown in a closed (lower) position.
Figure 3:
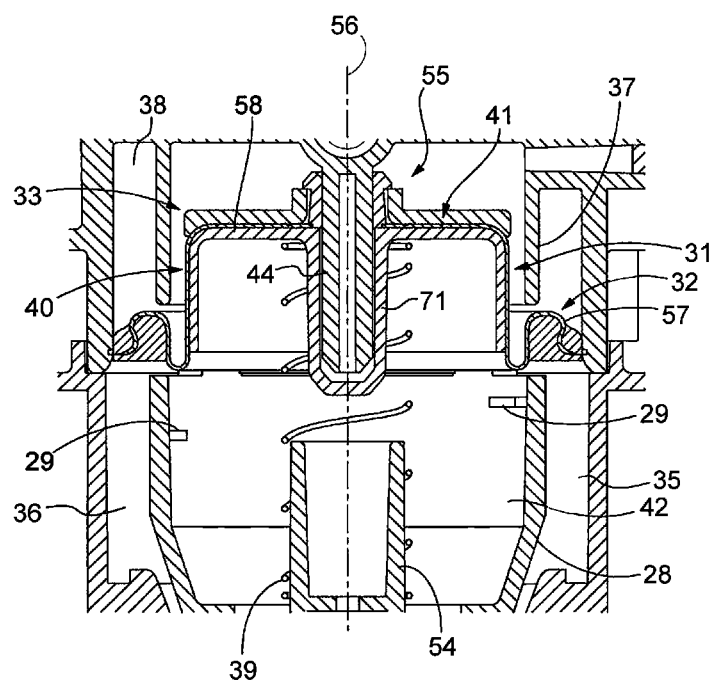
FIG. 3 is an enlarged view of another part of the separator shown in FIG. 2, the actuator of the separator shown in an open (upper) position.

FIG. 2 is a schematic cross-sectional view of a separator 5 according to an embodiment of the present invention, and which includes a jet pump 6 comprising a diffuser 20. FIG. 3 is an enlarged view of part of the separator 5 shown in FIG. 2, with an actuator 55 of the separator shown in an open (upper) position. A detailed description of the general structure and operating principals of the separator 5 will be provided below. In brief however, the main components and operation of the separator 5 are as follows.

The separator 5 includes a housing 21 which defines an inlet 22. The inlet 22 receives blow-by gases from the engine 2 along the inlet duct 3, as mentioned above. A first chamber 42 is defined by the housing 21 and arranged to receive a first fluid stream of blow-by gas from the inlet 22 for flow along the chamber. An impaction surface 35 is provided within the housing 21 and located downstream of the first chamber 42. The impaction surface 35 is arranged to deflect the first fluid stream after it leaves the first chamber 42, such that contaminants are separated from the first fluid stream.

A further chamber 43 is provided within the housing 21 and arranged to receive the first fluid stream following impaction on the impaction surface 35. The jet pump 6 is located downstream of the impaction surface 35, and is arranged to generate a pressure differential which draws the first fluid stream through the separator. The jet pump 6 is coupled to the housing 21 and comprises a fluid injection assembly 60 and a diffuser 20. The diffuser 20 is arranged in fluid communication with the further chamber 43 so that the first fluid stream exits the further chamber and flows into the diffuser. The fluid injection assembly 60 is arranged to inject a further fluid (typically air derived from the turbocharger 11) into the diffuser 20, to form a second fluid stream comprising the injected fluid and the first fluid stream.

In use, blow-by gas entering the inlet 22 flows up into the first chamber 42, as indicated by the arrow A in FIG. 2, before passing into the further chamber 43. The injection assembly 60 accelerates the further fluid to a high velocity and directs it along the diffuser 20. An upper chamber 19 is in fluid communication with the further chamber 43 and is subjected to a vacuum which serves to draw the first fluid stream from the further chamber 43 and into the diffuser 20, where the first fluid stream is mingled with the fluid injected through the injection assembly 60.

The separator 5 performs a primary separation of contaminants from the first fluid stream, which ultimately exit the separator through the drain 23. As will now be described, the diffuser 20, and the jet pump 6 comprising the diffuser, serve for removing at least some of any residual contaminants contained in the first fluid stream entering the diffuser.

Figure 4:
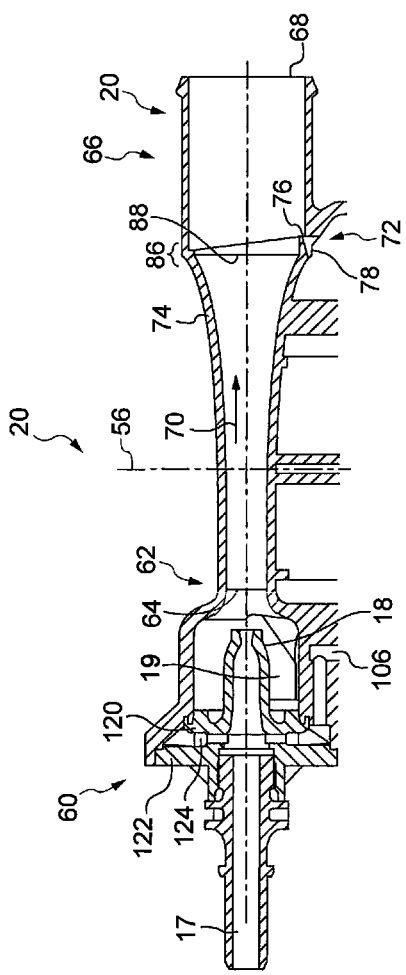
FIG. 4 is an enlarged view of the jet pump forming part of the separator shown in FIG. 2.

The diffuser 20 is shown in more detail in the enlarged view of FIG. 4. The diffuser 20 generally comprises an inlet portion 62 having an inlet 64 which is adapted to receive the first fluid stream, including residual entrained contaminants. The diffuser 20 also comprises an outlet portion 66 which is in fluid communication with the inlet portion 62, and which has an outlet 68 through which fluid exits the diffuser. A flow path for the first fluid stream is defined which extends from the inlet 64 to the outlet 68 and is indicated generally by reference numeral 70 in the drawing. The inlet 64 defines a first flow area, and the outlet 68 defines a second flow area which is greater than the first flow area. A velocity of fluid flowing through the inlet 64 is therefore greater than a velocity of fluid flowing through the outlet 68, whilst a pressure of the fluid at the inlet is less than a pressure of the fluid at the outlet. The diffuser 20 therefore acts as a venturi tube.

The diffuser 20 also comprises a communication port 72 which extends through a wall 74 of the diffuser. The communication port 72 has an inlet 76 which communicates with an interior of the diffuser and an outlet 78 which communicates with an exterior of the diffuser. The inlet 76 is located at a position along the flow path 70 which is between the diffuser inlet 64 and the diffuser outlet 68. During use, contaminants which have become separated from the fluid stream during the flow along the flow path 70 can be removed from the diffuser 20 through the communication port 72.

Figure 5:
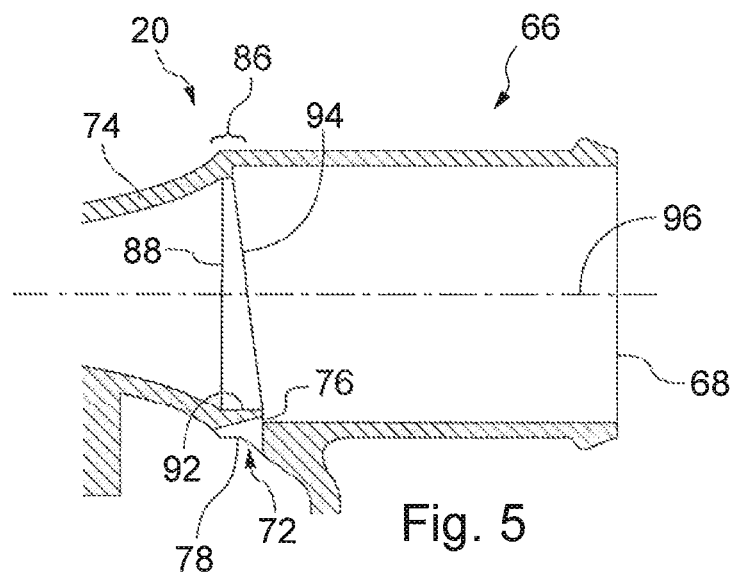
FIG. 5 is a further enlarged view of the jet pump, illustrating part of the diffuser in more detail.
Figure 6:
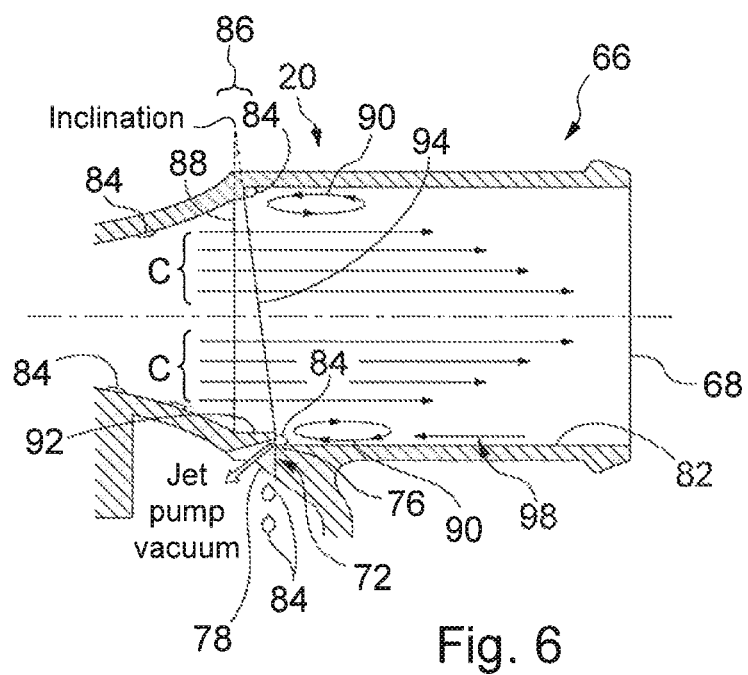
FIG. 6 is a view of the jet pump which is similar to FIG. 5, but which schematically illustrates the flow of fluid through the diffuser during use of the jet pump.

FIG. 5 is an enlarged view of the diffuser 20 showing the outlet portion 66 in more detail and better illustrating the communication port 72. FIG. 6 is a view similar to FIG. 5, schematically illustrating the flow of fluid through the diffuser 20 during use. The straight arrows indicated at C in the drawing illustrate the general direction of flow of the first fluid stream along the diffuser 20 towards the outlet 68. Contaminants, which will typically comprise liquid contaminants such as oil, tend to become separated from the first fluid stream and reside on an inner wall 82 of the diffuser 20, or can condense on the inner wall. The contaminants are indicated schematically by reference numeral 84 in the drawing. The communication port 72 facilitates removal of the contaminants 84 from the diffuser, reducing a risk of the contaminants becoming re-entrained with the fluid in the first fluid stream and so passing to the outlet 68 and exiting to atmosphere, or to other engine components such as the turbocharger compressor 10.

To facilitate contaminant removal through the communication port 72, the port is exposed to fluid at a pressure which is lower than a pressure of the fluid contained within the diffuser 20, so that the contaminants 84 are drawn through the communication port. Typically, the contaminants 84 will be entrained within a bleed stream which has become separated from the fluid flowing along the flow path 70 through the diffuser 20.

To achieve this, the outlet 78 of the communication port 72 is coupled to a source of a vacuum, in this case the further chamber 43. As explained above, the inlet 64 of the diffuser 20 communicates with the further chamber 43 via the upper chamber 19. Fluid flowing along the diffuser 20 reduces in velocity and increases in pressure. As a consequence, the inlet 76 of the communication port 72 is exposed to fluid contained within the outlet portion 66 of the diffuser 20, which is at a higher pressure than the fluid at the inlet 64, and indeed within the further chamber 43. This therefore creates a pressure differential across the communication port 72 which serves to draw the bleed stream and contaminants 84 through the communication port.

The communication port 72 is disposed in a location which promotes the flow of contaminants 84 from the diffuser 20 under the action of gravity. To this end, the communication port 72 extends through a part of the diffuser wall 74 which is disposed lowermost, during use of the diffuser. This facilitates flow of contaminants 84 from the diffuser 20 into the communication port 78. Typically, and viewing in a direction along the diffuser 20 from the outlet 68, the communication port 72 is disposed at or near a position that is approximately 180° around a circumference of the diffuser from its top, and so generally in a 6 o'clock position.

The diffuser 20 also comprises a transition portion 86, which is disposed between the inlet portion 62 and the outlet portion 66. The transition portion 86 has an opening 88 which defines a third flow area which is greater than the first flow area of the diffuser inlet 64, but less than the second flow area of the diffuser outlet 68. This promotes the formation of an eddy within the outlet portion 66, which is indicated by the reference 90 in FIG. 6. As will be understood, multiple eddies 90 may be formed. The eddy 90 is disposed downstream of the transition portion 86, typically towards or within a boundary layer of the fluid contained within the diffuser. A portion of the fluid flowing along the flow path 70 enters the eddy 90, flowing in a reverse direction away from the outlet 68 and towards the inlet 64. This serves to draw contaminants 84 towards the communication port 72, and typically re-entrains the contaminants so that they are drawn through the communication port 72 in the bleed stream.

Typically, the diffuser 20 is tubular and circular in cross-section. A diameter of the inlet 64 is less than a diameter of the outlet 68, thereby defining the different flow areas. Similarly, a diameter described by the transition portion opening 88 is greater than that of the inlet 64 but less than that of the outlet 68. A lip 92 is thus formed which is disposed within the flow path 70 through the diffuser, a diameter of the diffuser bore stepping up from the maximum internal diameter described by the lip (of the opening 88) to the maximum internal diameter defined by the outlet portion 66, which is the diameter of the outlet 68.

The lip 92 defines a surface 94 which faces generally towards the diffuser outlet 68. The lip surface 94 is disposed transverse to a longitudinal axis 96 of the diffuser. Typically, the lip surface 94 is disposed at a non-perpendicular angle relative to the axis 96 and may be disposed at an angle of up to around 89° relative to the axis. In the illustrated embodiment, the lip surface 94 is disposed at an angle of between around 80° to around 85° relative to the axis 96. The lip surface 94 is also declined in a direction from an upper region of the diffuser 20 towards a lower region. During use, contaminants 84 which have separated/condensed from the first fluid stream onto the inner wall 82 of the diffuser 20 in the region of the transition portion 86 will tend to flow down the lip surface 94 towards the communication port 72. To assist in contaminant withdrawal, the communication port 72 is located in the region of an intersection between the transition portion 86 and the outlet portion 66 of the diffuser 20. Typically, the communication port inlet 76 will open onto the outlet portion 66, however it may open onto the transition portion 86 (such as on or in the lip 92), or may open partially onto the transition portion and partially onto the outlet portion.

Figure 7:
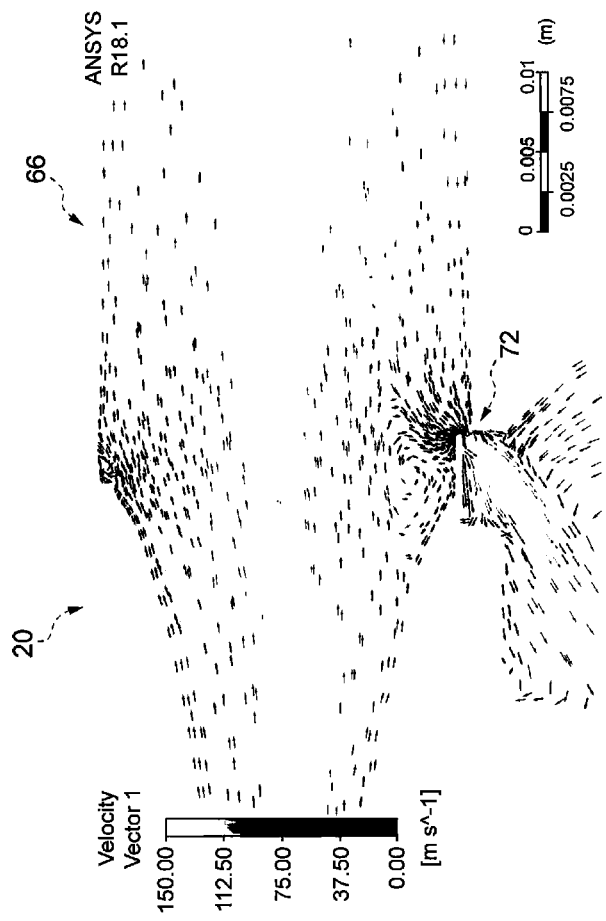
FIG. 7 is a velocity vector diagram showing the velocity vectors of fluid flowing through a part of the diffuser of the jet pump of FIG. 4, during use.

The combination of the eddy 90, and the suction affect through the communication port 72, acts to draw fluid in or near the boundary layer along the inner wall 82 towards the communication port 72, as indicated by reference numeral 98 in FIG. 6. FIG. 7 is a velocity vector diagram showing the velocity vectors of fluid flowing through the diffuser 20, illustrating the direction of fluid flow at the transition portion 86, into and through the communication port 72. The bleed stream exiting the diffuser 20 through the communication port 72 flows back into the further chamber 43. The contaminants 84 descend through the further chamber 43 to a sump 52, for subsequent drainage from the further chamber. The bleed stream gas mingles with fluid in the chamber 43 before being drawn back into the diffuser 20 by the action of the jet pump 6.

In the CCV system 1 shown in FIG. 2, the jet pump 6 forms a primary jet pump arranged to generate a pressure differential which draws the first fluid stream through the separator 5. The separator 5 can also be provided with a secondary jet pump, illustrated generally by reference numeral 100, which serves for evacuating contaminants from the further chamber 43, which have been separated from the first fluid stream and collected in the further chamber. In this way, the contaminants can flow through the drain 23 and exit the separator. As can be seen from FIG. 2, the secondary jet pump 100 is disposed entirely within the separator housing 21. The secondary jet pump 100 provides the advantage that contaminants can be continuously drained from the further chamber 43 during operation of the separator 5. Also, positioning the secondary jet pump 100 entirely within the housing enables fluid flow to and through the pump to be routed internally of the separator 5, which provides advantages including ease of manufacture and assembly, improved safely and improved aesthetic qualities.

Figure 2A:
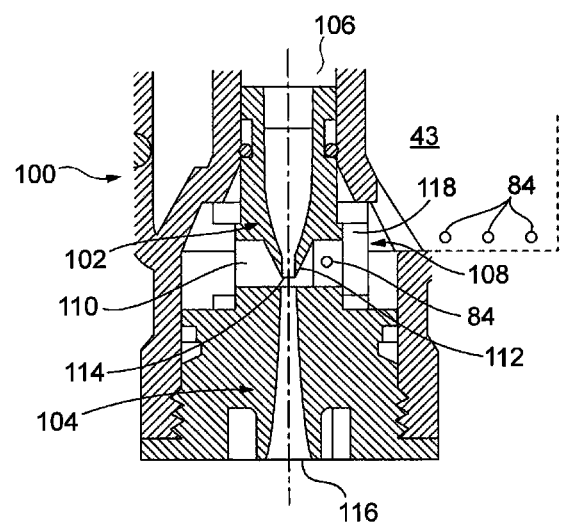
FIG. 2A is an enlarged view of part of the separator shown in FIG. 1.

In a similar fashion to the primary jet pump 6, the secondary jet pump 100 is arranged to generate a pressure differential, which in this case draws the contaminants from the further chamber 43. The secondary jet pump 100 receives a supply of fluid from the injection assembly 60 of the primary jet pump 6, to generate the pressure differential. The secondary jet pump 100 comprises a fluid injection assembly 102 and a diffuser 104. The injection assembly 102 is coupled to the injection assembly 60 of the primary jet pump 6 via a communication channel 106, which is routed internally of the housing 21. FIG. 2A is an enlarged view of the injection assembly 102 and diffuser 104, also showing part of the further chamber 43. The secondary jet pump 100 communicates with the further chamber 43 via an aperture 108, which opens onto a space 110 defined between an injector 112 of the injector assembly 102, and an inlet 114 of the diffuser 104. This serves to draw contaminants 84 from the chamber 43 into the space 110, where they pass into the diffuser inlet 114 and so are discharged through an outlet 116 of the diffuser and into a lower chamber 26 which communicates with the first chamber 42 (as will be described below). A filter screen 118 is mounted in the aperture 108, to filter out solids contaminants and prevent them from entering (and potentially blocking) the diffuser 104.

The fluid injection assembly 60 of the primary jet pump 6 comprises an injector in the form of a nozzle 18, which is arranged to inject the further fluid into the diffuser 20, and a flange 120 for securing the injection assembly to the housing 21. The flange 120 sealingly couples the nozzle 18 to the housing 21 via a friction weld. The fluid injection assembly 60 also comprise an inlet tube 17, and a flange 122 coupled to the inlet tube for securing the inlet tube to the housing 21. The inlet tube 17 is arranged to direct a fluid into the nozzle 18, which jets the fluid into the diffuser inlet 64. The flange 122 is also sealingly coupled to the housing 21 via a friction weld. The injector flange 122 forms an inner flange of the injection assembly 60, whilst the inlet flange 120 forms an outer flange of the assembly. A chamber 124 is defined between the inlet tube 17 and the injector 18, which communicates with both the nozzle 18 and the secondary jet pump 100 (via the communication channel 106). In this way, fluid can be supplied to both the primary jet pump 6 and the secondary jet pump 100 via a common inlet, in this case the inlet tube 17.

The friction welds securely couple the flanges 120 and 122 to the housing 21 and seal the flanges relative to the housing. This can be achieved in a single procedure or step and avoids a requirement to provide other couplings such as a threaded coupling, nut and bolt assemblies or the like between the flanges 120/122 and the housing 21. The housing 21 and the flanges 120 and 122 may be of a plastics material, which may be a polymeric material, particularly a thermoplastics material. This promotes fusion welding, such as in a spin welding technique, an ultrasonic welding technique, or an electromagnetic welding technique. It will be understood that other parts of the separator 5, including of the injection assembly 60 (particularly the inlet tube 17 and nozzle 18), may be formed of such materials.

Figure 8:
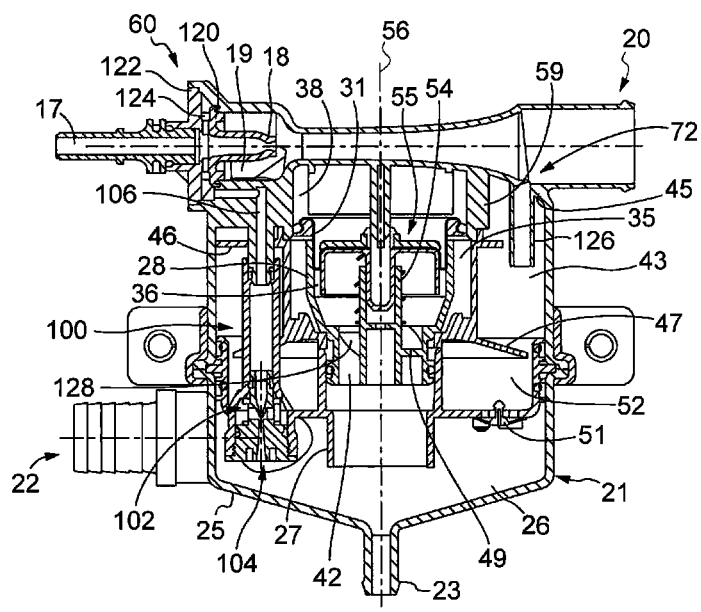
FIG. 8 is a cross-sectional side view of the CCV system shown in FIG. 1, comprising a separator according to another embodiment of the present invention.

Turning now to FIG. 8, there is shown a variation on the separator 5, which includes a contaminant outlet tube 126 arranged in fluid communication with the outlet 78 of the communication port 72. The outlet tube 126 defines a passage for the flow of contaminants (and fluid in which the contaminants may be entrained) from the diffuser 20 to a remote location. In the illustrated embodiment, the outlet tube 126 discharges contaminants to a calm zone in the further chamber 43, which is an area further down the chamber 43 that experiences reduced fluid disturbance. This helps to avoid re-entrainment of the contaminants in the fluid flowing through the separator 5 and into the diffuser 20. Typically, the outlet tube will be provided integrally with the diffuser 20 but may be provided as a separate component coupled to the diffuser.

The method of operation of the CCV system 1 (including the impactor separator 5), and further components of the separator, will now be described in more detail.

Returning to FIG. 2, an actuator 55 of the separator 5 is shown in the drawing in a closed (lower) position. The actuator 55 is better shown in the enlarged cross-sectional side view of FIG. 2, where the actuator is in an open (upper) position.

The CCV system 1 may be of a type which is similar to that disclosed in International Patent Publication No. WO-2014/155054 and/or International Patent Publication No. WO-2011/095790 (the disclosures of which are incorporated herein by way of reference). The CCV system 1 includes the separator 5 for separating liquid, aerosol and particulate contaminants from a blow-by gas stream. The separator 5 and pump 6 are shown.

The separator 5 and pump 6 are combined in a single unit. The housing 21 includes the inlet 22, and the oil drain outlet 23, which returns separated oil to the engine crankcase via the oil drain 16. The separator 5 includes a cylindrical dividing wall 28 extending lengthways within the separator housing 21, the interior of which forms the first chamber 42.

The housing 21 has a mounting plate 24 provided towards a base section 25 of the housing 21 and above an oil drain outlet 23. An underside of the plate 24 and base section 25 define a lower chamber 26 of the separator 5. The plate 24 has a separator inlet tube in the form of a vortex finder 27, which opens into the lower chamber 26 at one open end. The vortex finder 27 includes a helical blade 128 which directs the fluid along a helical path around an axis of the vortex finder as it flows along the chamber 42. The dividing wall 28 is mounted on the other, open end of the vortex finder 27. The vortex finder 27 connects the first chamber 42 to the lower chamber 26 to define a continuous passage for the blow-by gases to flow through from inlet 22 to the first chamber 42 via the lower chamber 26 and vortex finder 27. Blow-by gases from the crankcase are directed from the crankcase into the housing 21 via the inlet 22 and into the separator inlet tube 27 as indicated by the arrow A in FIG. 2.

The dividing wall 28 includes at least one aperture, and in the illustrated embodiment comprises an arrangement of spaced apertures 29 which are provided towards the upper end of the dividing wall 28 remote from the vortex finder 27. The upper end of the dividing wall 28 is closed off by means of a flexible seal in the form of a flexible diaphragm arrangement. The flexible diaphragm arrangement comprises a flexible diaphragm in the form of a rolling diaphragm 31, which is attached at an upper edge 30 of the dividing wall 28 by means of a sealing arrangement 32 which can be beading or an O-ring seal.

The pump 6 is mounted on the top of the housing 21 to form a single unit with the separator 5. As mentioned above, the pump 6 serves to generate a region of low gas pressure. This increases the velocity of the gases through the apertures 29 and draws contaminated blow-by gases through the separator 5. The pump inlet 17 receives the further fluid, which is a source of pressurised gas, referred to herein as boost gas. The boost gas is provided by the turbocharger 11 or any other source of pressurised gas such as exhaust gas. When used on a turbocharged engine the boost gas may be derived from a source of pressurised gas such as the intake manifold. Alternatively, the pressurised gas could be derived directly from the turbocharger. The pump inlet 17 feeds the nozzle 18, which is formed as a convergent nozzle, such as a de Laval nozzle, which serves to accelerate the boost gas to a high velocity, for instance between 100 to 500 m·s$^{-1}$, with the boost gas typically exceeding Mach 1 at least in the region of the convergent nozzle 18.

The inlet 17 is connected to an upper chamber 19 of the housing 21, which, in turn, is connected to the diffuser tube 20. The diffuser tube 20 is generally formed as a cylinder. The side walls of the diffuser tube 20 are not straight for the whole of their length and taper outwardly towards the end of the tube remote from the nozzle. This tapering assists in controlling the direction of flow and mixing of the combined gas flow.

The upper end of the housing 21 has the diffuser tube 20 mounted thereon. The diffuser tube 20 includes a mounting flange 45 for mounting the diffuser tube 20 on the housing 21. A cylindrical tube 34 extends from the underside of the diffuser tube 20. The upper end of the dividing wall 28, including the rolling diaphragm arrangement, is located within the cylindrical tube 34. The internal wall of the cylindrical tube 34 and the outer wall of the dividing wall 28 define an annular space 36. The internal wall of the cylindrical tube 34 provides an impaction surface 35, the function of which will be described in further detail below. The dividing wall 28 separates the first chamber 42 from the impaction surface 35, which in this embodiment is circular.

An inner circular flange 37 is provided concentrically within the cylindrical tube 34. The rolling diaphragm 31, along with inner circular flange 37, defines a second, upper reference chamber 38. The reference chamber 38 is at atmospheric pressure via an air inlet (not shown) which connects to the outside of the CCV system 1.

The space between cylindrical tube 34 and the housing 21 defines the further chamber 43 (which forms a third chamber of the separator), which is connected to the upper chamber 19 in the pump 6. An annular diffuser plate 46 is provided at the upper part of the housing 21 around the cylindrical tube 34 and separates the upper chamber 19 from the third chamber 43. The annular diffuser plate 46 has a curved aperture 50 formed therein which connects the third chamber 43 to the upper chamber 19. The curved aperture 50 extends partially around the annulus of the diffuser plate 46. Clean blow-by gas, stripped of contaminants and oil, flows from the annular space 36 through the third chamber 43 and is directed up to the chamber 19 and the pump 6 through the curved aperture 50. Thus, gas flowing from the annular space 36 does not take the direct path into the upper chamber 19, but rather takes a path which is between 90° to 180° from the upper chamber 19. This is shown by the path B in FIG. 2. The gas exits the annular space 36 via ports (not shown) in the tube 34.

The rolling diaphragm 31 is supported at a central, radially extending portion 41 by a support assembly 33 which is configured to move up and down in a longitudinal direction (along an actuator axis 56) within the first chamber 42, to cause the diaphragm 31 to sequentially cover and uncover the apertures 29 provided in the upper portion of the dividing wall 28 as it moves up and down. The support assembly may take the form of the support assembly forming part of the separator disclosed in the International patent application filed with the present application, with the title "AN ACTUATOR FOR USE IN A SEPARATOR", having agents' reference P223465WO/RXO. Features of the support assembly and optionally other features of the separator which are disclosed in that application are incorporated in this application by this reference.

The diaphragm 31 comprises an annular rolling portion 40, alternatively referred to as a rolling convolute, which is the portion that progressively covers and uncovers the apertures 29 as the central portion 41 moves up and down. The flexible diaphragm 31 has a natural (or 'home') state, which is shown in FIG. 3. In the home state, the flexible diaphragm 31 has a generally 'top-hat' shape, comprising the radially extending portion 41 (which provides an inner portion of the diaphragm); a convoluted portion which extends in a first axial direction away from the radially extending portion and is then folded back on itself so that it extends in a second (opposite) axial direction to define the convolute 40; and a radially outer portion 57, which defines a lip or brim. The radially extending portion 41 of the diaphragm is seated on a lower support member 58. The radially outer portion 57 is secured to a housing portion 59 of the separator, which is coupled to the cylindrical tube 34.

A cylindrical support 54 is located concentrically with the dividing wall 28. A biasing component in the form of a regulator spring 39 is located around the cylindrical support. The cylindrical support 54 is attached by means of protrusions 49 extending outwardly of the cylindrical support 54 and connected to the internal surface of the dividing wall 28. The regulator spring 39 acts on the support assembly 33 to regulate the movement of the support assembly 33 as it moves in response to changing pressure differential. The regulator spring 39 is supported by the protrusions 49 and positioned underneath the support assembly 33. The regulator spring 39 allows the range of normal operating pressure within the crankcase to be shifted within a range of values, for example in the range plus or minus 10 mBar. The support assembly 33 also includes a closed-ended tube 71 which is slidably mounted on a finger-like extension 44 extending from the diffuser tube 20. This arrangement serves to keep the support assembly 33 moving in the longitudinal direction.

A baffle 47 is supported on the mounting plate 24. The baffle 47 is located circumferentially around the periphery of the upper portion of the vortex finder 27. The baffle 47 promotes the upward flow of air within chamber 43, and serves to direct oil separated from the blow-by gas to the oil outlet 23 via a check valve 51. Oil separated from the gas therefore flows down the baffle 47 into a sump 52 formed in the mounting plate 24, and back to the oil outlet 23 through the check valve 51, which opens when the pressure in the lower chamber 26 is the same or slightly above that in the sump 52. A number of check valves 51 can be provided although only one is shown in FIG. 2.

In use, contaminated blow-by gas is actively drawn out of the crankcase and through the separator 5. The pressure drop across the separator 5 generated by the pump 6 overcomes the high-pressure differential of the separator 5 without causing an excessively high crankcase pressure. That is, because of the reduction in pressure caused by the pump 6, the blow-by gas may be drawn through a smaller impaction gap causing more efficient separation.

Gas is drawn into the vortex finder tube 27 generally along the path indicated by arrow A in FIG. 2 through the lower chamber 26. This section acts as a cyclonic pre-separator and the vortex finder 27 at this point defines the centre of a vortex of the gas. Liquid oil and large particles are separated from the gas at this stage and flow to the oil drain outlet 23. The blow-by gas then passes upwards through the vortex finder 27, into the first chamber 42 which is closed at its upper end by diaphragm 31. The blow-by gas passes through one or more of the apertures 29 and is incident upon the annular impaction surface 35. Oil and other contaminants separated from the blow-by gas at the impaction surface 35 flow under gravity to oil drain outlet 23 via the sloping baffle 47, sump 52 and check valve 51. Oil from the oil drain outlet 23 is returned to the crankcase.

The high-speed boost gas jet from the pump inlet 17 passes into chamber 19. The high velocity boost gas jet causes a region of reduced pressure within the chamber 19 in the vicinity of the nozzle 18. Pressure is reduced by up to 250 mbar relative to external atmospheric pressure. This reduction in pressure allows cleaned blow-by gas from the separator 5 to be drawn into chamber 19 generally along the path of arrow B in FIG. 2. The blow-by gas flow is entrained and accelerated by the boost gas, intermixing with the boost gas and accelerating to approach the speed of the boost gas. A terminal velocity will be reached at the outlet of the diffuser 20 based on total flow rate.

The combined gas stream passes into the diffuser tube 20. In order to achieve satisfactory entrainment and acceleration of the blow-by gas, preferably the diameter of the diffuser tube should be between 2 to 5 times greater, preferably 3 to 4 times greater, than the critical diameter (typically, the smallest diameter) of boost gas nozzle 18. The position of the critical diameter (alternatively referred to as the throat of the nozzle) may vary from the narrowest point of the nozzle due to aerodynamic effects, as is known in the art of nozzle design.

The separator 5 may be considered to be a variable impactor separator as it is intended to respond to differences between the blow-by gas inlet pressure and the outlet pressure to increase the separation efficiency.

As mentioned above, the reference chamber 38 is kept at atmospheric pressure by an air inlet which connects to the outside of the CCV system 1. The first chamber 42 and lower chamber 26 are therefore at substantially the same pressure as the engine crankcase.

The blow-by gas passes into the annular space 36 through one or more of the apertures 29. The number of apertures 29 open will vary as the rolling diaphragm 31 rolls up and down under control of the support assembly 33 to cover and uncover the apertures 29. The size and number of apertures 29 (which may take the form of slots) determines the minimum differential pressure drop across the separator 5. As the contaminated blow-by gas travels through the apertures 29, separation of oil particles due to radial acceleration of the particles occurs. The flow of the blow-by gas is through the apertures 29 and impaction and separation of oil particles due to radial acceleration in making a 180° turn occurs both on the diaphragm 31 face and as the blow-by gas hits the impaction surface 35.

The impaction surface 35 may be covered with a material opposite the apertures 29 to reduce the tendency of oil droplets and other contaminants to bounce off the impaction surface 35. The media covering the impaction surface serves to reduce re-entrainment of the contaminants, acting as a coalescer.

The pump 6 is used to overcome the pressure drop across the separator 5. Under various engine loads, speed or engine braking conditions both the vacuum generated by the pump 6, and the volume of blow-by gas passing through the separator 5 changes. To maintain an acceptable crankcase pressure according to the variable vacuum conditions generated by the pump 6, the diaphragm 31 moves up and down to cover and uncover the apertures 29.

The pump 6 is powered with air from the engine turbo and thus creates pressure lift. The developed pressure lift is used to enhance the performance of the impactor 5. By subjecting the third chamber 43 to vacuum, the pressure in the first chamber 42 will consequentially be reduced. The rolling diaphragm 31 responds to cover or close the apertures 29, and whilst the rolling diaphragm 31 is referenced to atmosphere, the pressure in the first chamber 42 will be stabilised relative to atmosphere. Similarly, if the vacuum is reduced in the third chamber 43, the pressure in the first chamber 42 will increase and the diaphragm 31 will respond to open up the apertures 29. This relationship then maintains near atmospheric pressure in the first chamber 42 and creates a pressure drop across the impactor 5. This pressure drop is directly related to the separation efficiency of the impactor 5. When the velocity of the gas is accelerated above 100 m/s the fractional efficiency of the impactor 5 is improved.

Thus, a low flow rate through the first chamber 42 or a high vacuum in the third chamber 43 tends to close the diaphragm 31 over the apertures 29 thus decreasing the aperture open area/increasing the pressure differential across the separator 5, and thus preventing excess negative pressures in the engine crankcase. Conversely, a high flow rate through the first chamber 42 or a low vacuum in the third chamber 43 tends to cause the diaphragm to open up more of the apertures 29 thus increasing the aperture open area/ decreasing the pressure differential across the separator 5 and preventing excess positive pressures in the engine crankcase.

The pressure differential of the separator 5 is adjusted and crankcase pressure can be regulated precisely according to atmospheric pressure on the opposing side of the rolling diaphragm 31 or with the specification of the regulator spring 39 which acts on the support assembly 33. The interaction between the apertures 29 and the rolling diaphragm 31 can maintain relative atmospheric pressure control to the upstream of the impaction surface 35.

Turning now to FIG. 9, there is shown a diffuser for a jet pump according to another embodiment of the invention, the diffuser indicated generally by reference numeral 20*a*. The diffuser 20*a* is essentially of the same construction and operation as the diffuser 20 shown in FIGS. 2 to 7 and described above, save that it has a communication port 72*a* which is arranged differently. Like components of the diffuser 20*a* with the diffuser 20 share the same reference numerals, with the addition of the suffix 'a'.

As can be seen from FIG. 9, the communication port 72*a* of the diffuser 20*a* is defined by a bore 130 extending through a wall 74*a* of the diffuser. The bore 130 has a longitudinal axis 132 extending between an inlet 76*a* and an outlet 78*a* of the communication port 72*a*. The axis 132 is substantially parallel to a longitudinal axis 96*a* of the diffuser, extending between its inlet 64*a* and its outlet 68*a*. The inlet 76*a* opens on a surface 94*a* of a lip 92*a* which is defined in a transition portion 86*a* and faces towards an outlet 68*a* of the diffuser. The diffuser 20*a* also includes a contaminant outlet tube 126*a* arranged in fluid communication with the outlet 78*a* of the communication port 72*a*, in a similar fashion to the embodiment shown in FIG. 8, and which again discharges contaminants to a calm zone in a further chamber of the jet pump (not shown in this drawing).

Turning now to FIG. 10, there is shown a cross-sectional side view of part of a diffuser for a jet pump in accordance with a further embodiment of the present invention, the diffuser indicated generally by reference numeral 20*b*. Like components of the diffuser 20*b* with the diffuser 20 share the same reference numerals, with the addition of the suffix 'b'. The diffuser 20*b* is also shown in the end view of FIG. 11. Only the substantive differences over the diffuser 20 will be discussed here.

The diffuser 20*b* comprises a channel 134 extending at least part way around an internal surface or inner wall 82*b* of the diffuser, and which communicates with a communication port 72*b* of the diffuser. The channel 134 serves for directing contaminants to an inlet 76*b* of the communication port 72*b* and extends around an internal circumference of the diffuser (in particular its outlet portion 66*b*). The channel 134 may help to prevent re-entrainment of contaminants 84*b* which have separated from the fluid flowing through the diffuser back into the body of fluid flowing along the diffuser towards the outlet. The channel 134 may also assist in directing contaminants to the communication port 72*b* for evacuation.

The channel 134 is disposed at a non-perpendicular angle relative to a longitudinal axis 96*b* of the diffuser 20*b*, suitably in the range of about 80° to about 89°, for example about 80° to about 85°, optionally at least 1° relative to a line which is perpendicular to the longitudinal axis, declined in a direction from an upper region of the diffuser towards a lower region of the diffuser. This may be of particular assistance in directing contaminants 84*b* to the communication port 72*b*.

The channel 134 is defined by a channel element 136, which is located within the diffuser 20*b* at a position along its flow path 70*b* that is disposed between the inlet of the diffuser (not shown in this drawing) and the outlet 68*b* of the diffuser. The channel element 136 takes the form of an insert which is located within the diffuser 20*b*, suitably within a bore 138 of the diffuser. Typically, the channel element 136 is annular or ring-shaped, provided as an insert ring, and arranged in a press or interference fit within the diffuser bore. Polymeric materials may be suitable for forming the channel element 136, particularly where it is a press-fit in the diffuser. However, mechanical location features and/or an adhesive may be used to secure the channel element 136 in place.

The channel 134 is defined between an external surface 140 of the channel element 136 and the internal surface 82*b* of the diffuser. To this end, the channel element 136 comprises an inner surface 142 (which defines a tubular bore 144 forming part of the flow path 70*b*), and the external surface 140. A recess or step 146 extends around the outer surface 140 so that the channel 134 is defined between the recess and the internal surface 82*b* of the diffuser 20*b*. In this way, the recess is closed-off from direct communication with the diffuser bore.

The channel element 136 also comprises at least one flow passage 148 which communicates with the channel 134, and in the illustrated embodiment comprises four such flow passages spaced apart around the channel element, three of the flow passages 148 being shown in the drawing. In use, contaminants 84*b* are drawn through the flow passages 148 into the channel 134, and then out of the diffuser 20*b* through the communication port 72*b* (which opens on to the channel).

The flow passages 148 in the embodiment of FIG. 10 are downstream flow passages, having first ends 150 which open on to the channel 134, and second ends 152 which open on to the interior of the diffuser at a location which is downstream of the communication port 72*b*, in this case in the outlet portion 66*b*. The flow passages 148 serve for drawing contaminants 84*b*, in or near an eddy defined downstream of the channel element 136, into the channel 134 and so to the communication port 72*b* and out of the diffuser 20*b*.

The flow passages 148 extend through the channel element 136, suitably through a body of the channel element, and are provided either as closed passages such as a bore through the body, or as a recess formed in the outer surface 140 of the channel element. The flow passages 148 are spaced apart around a circumference of the channel element 136 and are suitably equally spaced. Whilst any desirable number of passages may be provided (depending on physical constraints), possible arrangements include flow passage spacings of 120°, 90°, 60°, 45° and 30°. A particularly suitable spacing is 90°, as shown in the drawings, measured from centre to centre of the flow passages, with flow passages 148 at the 12, 3, 6 and 9 o'clock positions.

The channel element 136 comprises a central opening 153 which defines the bore 144, and which forms part of the flow path 70*b*. The central opening 153 defines a further flow area which is less than the second flow area defined by the diffuser outlet 68*b*, and greater than the first flow area defined by the diffuser inlet. In the illustrated embodiment, the channel element 136 defines part of a transition portion 86*b*, in the fashion described above.

Turning now to FIG. 11, there is shown a cross-sectional side view of part of a diffuser for a jet pump in accordance with a further embodiment of the present invention, the diffuser indicated generally by reference numeral 20c Like components of the diffuser 20c with the diffuser 20 share the same reference numerals, with the addition of the suffix 'c'. The diffuser 20c is also shown in the end view of FIG. 13.

The diffuser 20c shown in FIG. 11 is essentially a variation on the diffuser 20b of FIG. 10, including a different channel element 136c. In this embodiment, the channel element 136c again defines a channel 134c, and downstream flow passages 148c which serve to draw contaminants from an upstream location. However, the channel element 136c additionally defines an upstream flow passage, as will now be described.

An upstream flow passage 154 is shown in the drawing, having a first end 156 which opens on to the channel 134c, and a second end 158 which opens on to the interior of the diffuser 20c at a location which is upstream of the communication port, suitably in a throat 160 downstream of the diffuser inlet (not shown). The upstream flow passage 154 serves for drawing contaminants 84c at or near an internal surface 82c of the diffuser (e.g. at or in a boundary layer) upstream of the channel element 136c into the channel 134c, and so to the communication port 72c.

The upstream flow passage 154 is defined between an external surface 140c of a part of the channel element 136c, and the internal surface 82c of the diffuser 20c. The flow passage 154 takes the form of a space or void extending around the external surface 140c, and particularly takes the form of an annular passage extending around an entire circumference of the channel element 136c. The channel element 136c comprises a shoulder part 162 which is shaped to abut an internal surface of the diffuser 20c, for mounting the channel element in the diffuser, and a channel part 164 which extends from the shoulder part and defines at least part of the channel 134c. The channel part 164 is mountable within the diffuser bore 138 so that it is free floating/cantilevered, spaced from the internal surface 82c of the diffuser 20c. This is achieved via the shoulder part 162, which mounts the channel element 136c in the diffuser.

In the illustrated embodiment, the shoulder part 162 and the channel part 164 are provided integrally but can be separate parts which are coupled together. As can be seen from the drawing, the channel part 164 defines both the channel 134c, and the upstream flow passage 154. In this embodiment, the channel element 136c forms a transition portion 86c of the diffuser 20c (as described above), having a central opening 153c which defines a flow area that is less than the second flow area defined by the diffuser outlet 68c, and greater than the first flow area defined by the diffuser inlet.

In the illustrated embodiments, the jet pumps are all shown located at or towards a top of the separators shown in the drawings. It will be understood however that the jet pumps need not be located in that position and may for example be located on or adjacent a side of the respective separator, optionally below a level of a top of the separator. The communication ports of the jet pump diffusers will be located in a position which is appropriate to such a location, although it may be preferred that the port be at a lower position (e.g. the 6 o'clock positions shown in the drawings) in order to promote contaminant drainage. A conduit associated with the communication port (e.g. the contaminant outlet tubes discussed above) may be appropriately directed. For example, the conduit may extend in a side or lateral direction towards a housing of the separator.

The diffuser, jet pump, and separator of the present invention provides numerous advantages over prior separators, including the withdrawal of residual contaminants which have separated/condensed from the fluid flowing through the diffuser.

Various modifications may be made to the foregoing without departing from the spirit and scope of the present invention.

For example, whilst the diffuser may have a generally circular shape in cross-section, including a bore extending from the inlet to the outlet which bore is generally circular in shape, other arcuate shapes for the diffuser/bore may be suitable, including elliptical and oval.

Whilst the withdrawal of contaminants from the diffuser can be affected via a single communication port, it will be understood that the diffuser may comprise a plurality of communication ports. The communication ports may be spaced apart around a perimeter of the diffuser, and/or along a length of the diffuser.

The transition portion may comprise a ridge, rim, ledge, step or shoulder, which may describe the maximum internal dimension of the opening. Whilst the lip surface may be substantially planar so that all of the lip surface is in the same plane and at the same angle, the lip surface may alternatively be curved.

At least part of the inlet of the communication port may open on to the transition portion, for example the lip surface. The inlet may straddle the transition portion (for example the lip surface) and the outlet portion.

The invention claimed is:

1. A diffuser for a jet pump of a separator for separating contaminants from a first fluid stream in which the contaminants are entrained, the diffuser comprising:
   an inlet portion having a diffuser inlet which is adapted to receive the first fluid stream including the entrained contaminants, the inlet defining a first flow area;
   an outlet portion in fluid communication with the inlet portion and having a diffuser outlet through which the first fluid stream can exit the diffuser,
   a flow path for the first fluid stream is defined which extends from the diffuser inlet to the diffuser outlet, and the diffuser outlet defines a second flow area which is greater than the first flow area so that a velocity of the first fluid stream flowing through the diffuser inlet is greater than a velocity of the first fluid stream flowing through the diffuser outlet, the diffuser outlet defining a first maximum internal dimension;
   a transition portion disposed between the inlet portion and the outlet portion, the transition portion defining a third flow area which is greater than the first flow area but less than the second flow area, and an opening defining a second maximum internal dimension; and
   a communication port extending through a wall of the diffuser and having a port inlet which communicates with an interior of the diffuser and a port outlet which communicates with an exterior of the diffuser, the port inlet of the communication port is located at a position along the flow path which is between the diffuser inlet and the diffuser outlet and with at least a portion of the port inlet located below a longitudinal center axis of the diffuser during use, so that the entrained contaminants which have become separated from the first fluid stream during flow along the flow path can be removed from the diffuser through the communication port;
   the second maximum internal dimension defined by the opening of the transition portion is less than the corresponding first maximum internal dimension defined by the diffuser outlet; and the transition portion comprises a lip which defines a third maximum internal dimension of an opening at least partially defined by the lip, the lip being disposed in the flow path, an internal bore of the diffuser increasing from the third maximum internal dimension described by the lip to the first maximum internal dimension defined by the outlet of the outlet portion, with at least a portion of the communication port overlapping the lip in a radial direction perpendicular to the longitudinal center axis of the diffuser.

2. A diffuser as claimed in claim 1, in which the port outlet of the communication port is adapted to be exposed to a fluid at a pressure which is lower than a pressure of the first fluid stream contained within the diffuser.

3. A diffuser as claimed in claim 1, in which the communication port extends through a part of the wall of the diffuser which is disposed lowermost during use.

4. A diffuser as claimed in claim 3, in which the communication port is disposed approximately 180° around a circumference of the diffuser at a position below an upper region of the diffuser.

5. A diffuser as claimed in claim 1, further comprising a contaminant outlet tube in fluid communication with the port outlet of the communication port.

6. A diffuser as claimed in claim 1, in which the first maximum internal dimension is a first diameter, and the second maximum internal dimension is a second diameter, and the diffuser inlet defines a maximum internal dimension which is a third diameter, the first diameter is greater than the third diameter, and the second diameter is greater than the third diameter and less than the first diameter.

7. A diffuser as claimed in claim 6, in which the third maximum internal dimension of the opening at least partially defined by the lip is a fourth diameter, and the internal bore of the diffuser increases from the fourth diameter at least partially defined by the lip to the first diameter defined by the outlet.

8. A diffuser as claimed in claim 6, in which the lip defines a surface which faces generally towards the diffuser outlet.

9. A diffuser as claimed in claim 8, in which the diffuser defines a longitudinal center axis extending from the diffuser inlet to the diffuser outlet, and in which the lip surface is disposed transverse to the longitudinal center axis.

10. A diffuser as claimed in claim 9, in which the lip surface is disposed at an angle of at least 1° relative to a line which is perpendicular to the longitudinal center axis.

11. A diffuser as claimed in claim 8, in which the lip surface is declined in a direction from an upper region of the diffuser towards a lower region of the diffuser.

12. A diffuser as claimed in claim 1, in which the communication port is located in the region of an intersection between the transition portion and the outlet portion.

13. A diffuser as claimed in claim 8, in which the lip surface comprises a lower region having an edge which is disposed above the port inlet and proximate to the port inlet in a direction along the length of the diffuser, so as to promote the flow of contaminants from the lip surface towards the port inlet.

14. A diffuser as claimed in claim 1, in which the port inlet of the communication port opens into the outlet portion of the diffuser.

15. A diffuser as claimed in claim 14, in which part of the port inlet of the communication port opens into the transition portion.

16. A diffuser as claimed in claim 1, further comprising a channel extending at least part way around an internal surface of the diffuser, in which the channel communicates with the communication port of the diffuser and serves for directing the contaminants to the port inlet of the communication port.

17. A diffuser as claimed in claim 16, in which the channel is defined by a channel element which is located within the diffuser at a position along the flow path disposed between the diffuser inlet and the diffuser outlet, and in which the channel is defined between an external surface of the channel element and the internal surface of the diffuser.

18. A diffuser as claimed in claim 17, in which the channel element is an annular insert which is locatable within the internal bore of the diffuser.

19. A diffuser as claimed in claim 17, in which the channel element comprises at least one flow passage which communicates with the channel, such that contaminants can be drawn through said flow passage into the channel, and then out of the diffuser through the communication port.

20. A diffuser as claimed in claim 19, further comprising at least one downstream flow passage having a first end which opens into the channel, and a second end which opens into the interior of the diffuser at a location which is downstream of the communication port.

21. A diffuser as claimed in claim 20, in which the at least one downstream flow passage extends through a body of the channel element.

22. A diffuser as claimed in claim 19, further comprising at least one upstream flow passage having a first end which opens into the channel, and a second end which opens into the interior of the diffuser at a location which is upstream of the communication port.

23. A diffuser as claimed in claim 22, in which the at least one upstream flow passage is defined between an external surface of a part of the channel element and the internal surface of the diffuser and defines an annular passage extending around the external surface of said part of the channel element.

24. A diffuser as claimed in claim 17, in which the channel element comprises a shoulder part adapted to abut the internal surface of the diffuser and a channel part which extends from the shoulder part and defines at least part of the channel.

25. A jet pump comprising a diffuser according to claim 1.

26. A separator comprising a jet pump having a diffuser according to claim 1.

27. A separator according to claim 26, further comprising: a housing defining a housing inlet and a drain; a first chamber provided within the housing, the first chamber arranged to receive a second fluid stream from the housing inlet for flow along the first chamber; and an impaction surface provided within the housing and located downstream of the first chamber; in which the jet pump is located downstream of the impaction surface and arranged to generate a pressure differential which draws the second first fluid stream through the separator.

28. A separator according to claim 27, further comprising a second chamber provided within the housing and arranged to receive the second fluid stream following impaction on the impaction surface, in which the jet pump communicates with the second chamber to generate a region of reduced pressure in the second chamber which serves to draw the second fluid stream through the separator, and the port outlet of the communication port communicates with the second chamber.

29. A separator according to claim 27, in which the jet pump further comprises a fluid injection assembly, the fluid injection assembly being arranged to inject at least a portion of the second fluid stream into the diffuser to mix with the first fluid stream, and in which the fluid injection assembly comprises an injector arranged to inject the at least a portion of the second fluid stream into the diffuser, and a flange for securing the injection assembly to the housing, the flange being sealingly coupled to the housing via a friction weld.

30. A separator according to claim 27, in which the jet pump is a primary jet pump and the separator comprises a secondary jet pump for evacuating contaminants from the second chamber, in which the secondary jet pump is disposed entirely within the housing.

31. A separator according to claim 30, in which the secondary jet pump communicates with the drain so that the contaminants can exit the separator through the drain.

32. A separator according to claim 30, in which the secondary jet pump receives a portion of the first fluid stream entering an inlet of the primary jet pump from a first injection assembly of the primary jet pump.

33. A separator according to claim 32, in which the secondary jet pump comprises a second fluid injection assembly and a second diffuser, and in which a communication channel is provided between the first injection assembly of the primary jet pump and the second injection assembly of the secondary jet pump, the communication channel being routed internally of the housing.

34. A separator according to claim 32, in which the second diffuser of the secondary jet pump has a second outlet which communicates with a lower chamber of the separator, which defines the drain.

35. A separator according to claim 27, in which the jet pump further comprises a fluid injection assembly, the fluid injection assembly comprising: an injector arranged to inject at least a portion of the second fluid stream into the diffuser and a first flange coupled to the injector for securing the injector to the housing; an inlet tube and a second flange coupled to the inlet tube for securing the inlet tube to the housing; in which the first and second flanges are sealingly coupled to the housing via friction welds.

36. A separator according to claim 35, in which the jet pump is a primary jet pump and the separator comprises a secondary jet pump for evacuating the contaminants from the second chamber, the secondary jet pump is disposed entirely within the housing, and the first flange is an inner flange and the second flange is an outer flange, and a communication chamber is defined between the inlet tube and the injector which communicates with the secondary jet pump.

* * * * *